United States Patent
Matsuo

(10) Patent No.: US 10,896,226 B2
(45) Date of Patent: Jan. 19, 2021

(54) DATA ANALYSIS SYSTEM, DATA ANALYSIS METHOD, AND DATA ANALYSIS PROGRAM

(71) Applicant: HITACHI, LTD., Tokyo (JP)

(72) Inventor: Taichi Matsuo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 212 days.

(21) Appl. No.: 16/124,541

(22) Filed: Sep. 7, 2018

(65) Prior Publication Data
US 2019/0080022 A1 Mar. 14, 2019

(30) Foreign Application Priority Data
Sep. 8, 2017 (JP) .................. 2017-173452

(51) Int. Cl.
| | | |
|---|---|---|
| *G06F 16/00* | (2019.01) | |
| *G06F 16/903* | (2019.01) | |
| *G06F 16/901* | (2019.01) | |
| *G06F 16/9038* | (2019.01) | |
| *G06F 16/215* | (2019.01) | |

(52) U.S. Cl.
CPC ...... *G06F 16/90335* (2019.01); *G06F 16/215* (2019.01); *G06F 16/901* (2019.01); *G06F 16/9038* (2019.01)

(58) Field of Classification Search
CPC ............. G06F 16/90335; G06F 16/215; G06F 16/901; G06F 16/9038; G06F 16/335; G06F 16/435; G06F 16/635; G06F 16/735
See application file for complete search history.

(56) References Cited

U.S. PATENT DOCUMENTS

| | | | | |
|---|---|---|---|---|
| 8,296,654 | B2 * | 10/2012 | Ahlberg | G06F 9/451 |
| | | | | 715/704 |
| 8,510,288 | B2 * | 8/2013 | Mital | G06F 40/18 |
| | | | | 707/708 |
| 9,454,785 | B1 * | 9/2016 | Hunter | G06F 16/285 |
| 10,489,391 | B1 * | 11/2019 | Tomlin | G06F 16/285 |
| 10,489,470 | B2 * | 11/2019 | Sathish | G06F 16/335 |
| 10,505,825 | B1 * | 12/2019 | Bettaiah | G06F 16/22 |
| 2004/0006447 | A1 * | 1/2004 | Gorin | G01R 31/31707 |
| | | | | 702/181 |
| 2005/0144641 | A1 * | 6/2005 | Lewis | H04N 21/4325 |
| | | | | 725/60 |

(Continued)

FOREIGN PATENT DOCUMENTS

| | | |
|---|---|---|
| JP | 2016-29516 A | 3/2016 |
| WO | 2016/013280 A1 | 1/2016 |

*Primary Examiner* — Mohammed R Uddin
(74) *Attorney, Agent, or Firm* — Mattingly & Malur, PC

(57) ABSTRACT

A data analysis system executes data analysis in response to a data analysis request from a plurality of data analysis request sources and includes a filtering unit, a data analysis unit, a data storage unit, and a filter control unit. The filtering unit filters input data by applying a predetermined filter to the input data. The data analysis unit analyzes the filtered input data. The data storage unit stores the input data and result data as data that has been analyzed. The filter control unit records application history of a filter applied in response to the data analysis request, and refers to the filter application history for a new data analysis request to select a filter suitable for data analysis to be executed, and transfers the selected filter to the filtering unit.

9 Claims, 17 Drawing Sheets

(56) References Cited

U.S. PATENT DOCUMENTS

| | | | | |
|---|---|---|---|---|
| 2006/0218187 | A1* | 9/2006 | Plastina | G06F 16/4387 |
| 2007/0177135 | A1* | 8/2007 | Tuohy | G05B 23/0221 |
| | | | | 356/237.2 |
| 2007/0255441 | A1* | 11/2007 | Antanies | G05B 23/0232 |
| | | | | 700/108 |
| 2008/0319829 | A1* | 12/2008 | Hunt | G06Q 30/0201 |
| | | | | 705/7.29 |
| 2009/0124241 | A1* | 5/2009 | Krishnaswamy | G06F 40/10 |
| | | | | 455/414.2 |
| 2009/0307054 | A1* | 12/2009 | D'Imporzano | G06Q 10/06393 |
| | | | | 705/7.29 |
| 2011/0314400 | A1* | 12/2011 | Mital | G06F 16/26 |
| | | | | 715/771 |
| 2014/0100963 | A1* | 4/2014 | Ruan | H04L 67/02 |
| | | | | 705/14.64 |
| 2014/0280226 | A1* | 9/2014 | Wilson | G06Q 30/0631 |
| | | | | 707/748 |
| 2015/0088606 | A1* | 3/2015 | Tyagi | G06Q 30/0202 |
| | | | | 705/7.31 |
| 2016/0335588 | A1* | 11/2016 | Knobel | G06K 19/06028 |
| 2016/0344758 | A1* | 11/2016 | Cohen | G08B 21/18 |
| 2017/0235820 | A1* | 8/2017 | Conrad | G06F 16/358 |
| | | | | 707/728 |
| 2017/0235848 | A1* | 8/2017 | Van Dusen | G06F 16/904 |
| | | | | 705/12 |
| 2018/0027006 | A1* | 1/2018 | Zimmermann | H04L 63/0245 |
| | | | | 726/11 |

* cited by examiner

FIG. 16

| TENANT | INPUT FILTER | SELECTION CRITERION | CRITERION CONTENT | CONFORMITY RATE | UPDATE TIME AND DATE | ... |
|---|---|---|---|---|---|---|
| TENANT 1 | FILTER A | ANALYSIS OBJECTIVE | FAILURE DETECTION | 2 | 2017/03/20 11:00:00 | ... |
| TENANT 1 | FILTER A | ANALYSIS OBJECTIVE | BUSINESS EFFICIENCY IMPROVEMENT | 15 | 2017/03/19 12:00:00 | ... |
| TENANT 1 | FILTER A | INPUT DATA TYPE | TEMPERATURE DATA | 14 | 2017/02/01 15:00:10 | ... |
| TENANT 1 | FILTER B | ANALYSIS OBJECTIVE | FAILURE DETECTION | 10 | 2017/03/18 11:00:00 | ... |
| TENANT 1 | FILTER B | INPUT DATA TYPE | TEMPERATURE DATA | 8 | 2017/03/20 11:00:00 | ... |
| TENANT 1 | FILTER B | INPUT DATA TYPE | SALES | 5 | 2017/03/16 10:00:00 | ... |
| TENANT 1 | FILTER B | INPUT DATA TYPE | NUMBER OF VISITORS | 10 | 2017/03/20 11:21:10 | ... |
| TENANT 2 | FILTER A | ANALYSIS OBJECTIVE | FAILURE DETECTION | 20 | 2017/03/10 11:21:10 | ... |

FIG. 17

| TENANT | INPUT FILTER | SELECTION CRITERION | CRITERION CONTENT | FILTER CONDITION CONFORMITY RATE | UPDATE TIME AND DATE | CONDITION | |
|---|---|---|---|---|---|---|---|
| | 1702 | 1703 | 1704 | 1705 | 1706 | 1707 | 1708 |
| TENANT 1 | FILTER A | ANALYSIS OBJECTIVE | FAILURE DETECTION | 2 | 2017/03/20 11:00:00 | ±1σ | ... |
| TENANT 1 | FILTER A | ANALYSIS OBJECTIVE | BUSINESS EFFICIENCY IMPROVEMENT | 15 | 2017/03/19 12:00:00 | ±1σ | ... |
| TENANT 1 | FILTER A | ANALYSIS OBJECTIVE | FAILURE DETECTION | 10 | 2017/03/20 11:10:00 | ±2σ | ... |
| TENANT 1 | FILTER A | INPUT DATA TYPE | TEMPERATURE DATA | 14 | 2017/02/01 15:00:10 | ±2σ | |
| TENANT 1 | FILTER B | INPUT DATA TYPE | TEMPERATURE DATA | 8 | 2017/03/20 11:00:00 | 0 DEGREES OR HIGHER | ... |
| TENANT 1 | FILTER B | INPUT DATA TYPE | SALES | 5 | 2017/03/16 10:00:00 | 10M YEN OR MORE | ... |
| TENANT 1 | FILTER B | INPUT DATA TYPE | NUMBER OF VISITORS | 10 | 2017/03/20 11:21:10 | 1,000 PERSONS OR MORE | ... |
| TENANT 2 | FILTER A | ANALYSIS OBJECTIVE | FAILURE DETECTION | 20 | 2017/03/10 11:21:10 | ±1σ | ... |

DATA ANALYSIS SYSTEM, DATA ANALYSIS METHOD, AND DATA ANALYSIS PROGRAM

CROSS-REFERENCE TO RELATED APPLICATION

This application claims priority pursuant to 35 U.S.C. § 119 from Japanese Patent Application No. 2017-173452, filed on Sep. 8, 2017, the entire disclosure of which is incorporated herein by reference.

BACKGROUND

Technical Field

The present invention relates to a data analysis system, a data analysis method, and a data analysis program.

Related Art

Along with the development of IoT technology, there is an increasing demand for analyzing a large amount of various raw data to be incorporated in various data processing systems and achieving quality improvement of service provided by a target system, efficient data processing, and the like. With respect to this, JP 2016-29516 A discloses a technique of recommending an analysis logic for performing the next data analysis based on the past data analysis information to a user of an analysis system as a means for solving the problem, "to provide an analysis system that takes into consideration a skill of a user of the analysis system in data analysis using a plurality of types of analysis techniques".

SUMMARY OF THE INVENTION

When analyzing a large amount of raw data, it is necessary to remove noise mixed in raw data according to an analysis purpose or the like using an appropriate noise filter. In this regard, the technique described in JP 2016-29516 A provides the system taking into consideration the skill of the user of the analysis system by including a plurality of analysis logic units performing data analysis and recommending the data analysis logic to be performed next based on the past data analysis information, but has no disclosure for recommendations on filtering input data.

In addition, a configuration in which a tenant as a management system dedicated to each organization is connected to an analysis system to share basic functions such as noise filtering of input data has been adopted in order to share a large-scale analysis system among a plurality of organizations such as companies. However, the PTL1 has no statement on such a concept of the tenant in which the plurality of organizations shares the analysis system.

The present invention has been made to solve the above and other problems, and an object thereof is to provide a data analysis system, a data analysis method, and a data analysis program that enable appropriate noise filtering of input data regardless of an analytical skill of a user.

In order to solve the above and other problems, a data analysis system according to one aspect of the present invention is a data analysis system that executes data analysis in response to a data analysis request from a plurality of data analysis request sources, and includes: a filtering unit that filters input data by applying a predetermined filter to the input data; a data analysis unit that analyzes the filtered input data; a data storage unit that stores the input data and result data as data that has been analyzed; and a filter control unit that records application history of a filter applied in response to the data analysis request, and refers to the filter application history for a new data analysis request to select a filter suitable for data analysis to be executed, and transfers the selected filter to the filtering unit. Note that, a data analysis method corresponding to the data analysis system and a data analysis program for causing a computer to execute the data analysis method also pertain to the scope of the present invention.

According to one aspect of the present invention described above, the data analysis system, the data analysis method, and the data analysis program that enable the appropriate noise filtering of input data regardless of the analytical skill of the user are provided.

BRIEF DESCRIPTION OF THE DRAWINGS

FIG. 16 is a table illustrating a configuration example of an input filter data table of a filter history storage unit; and FIG. 17 is a table illustrating a configuration example of an input filter condition data table of a filter history storage unit.

DETAILED DESCRIPTION OF THE INVENTION

Hereinafter, embodiments of the present invention will be described with reference to the drawings.

Figure 1:
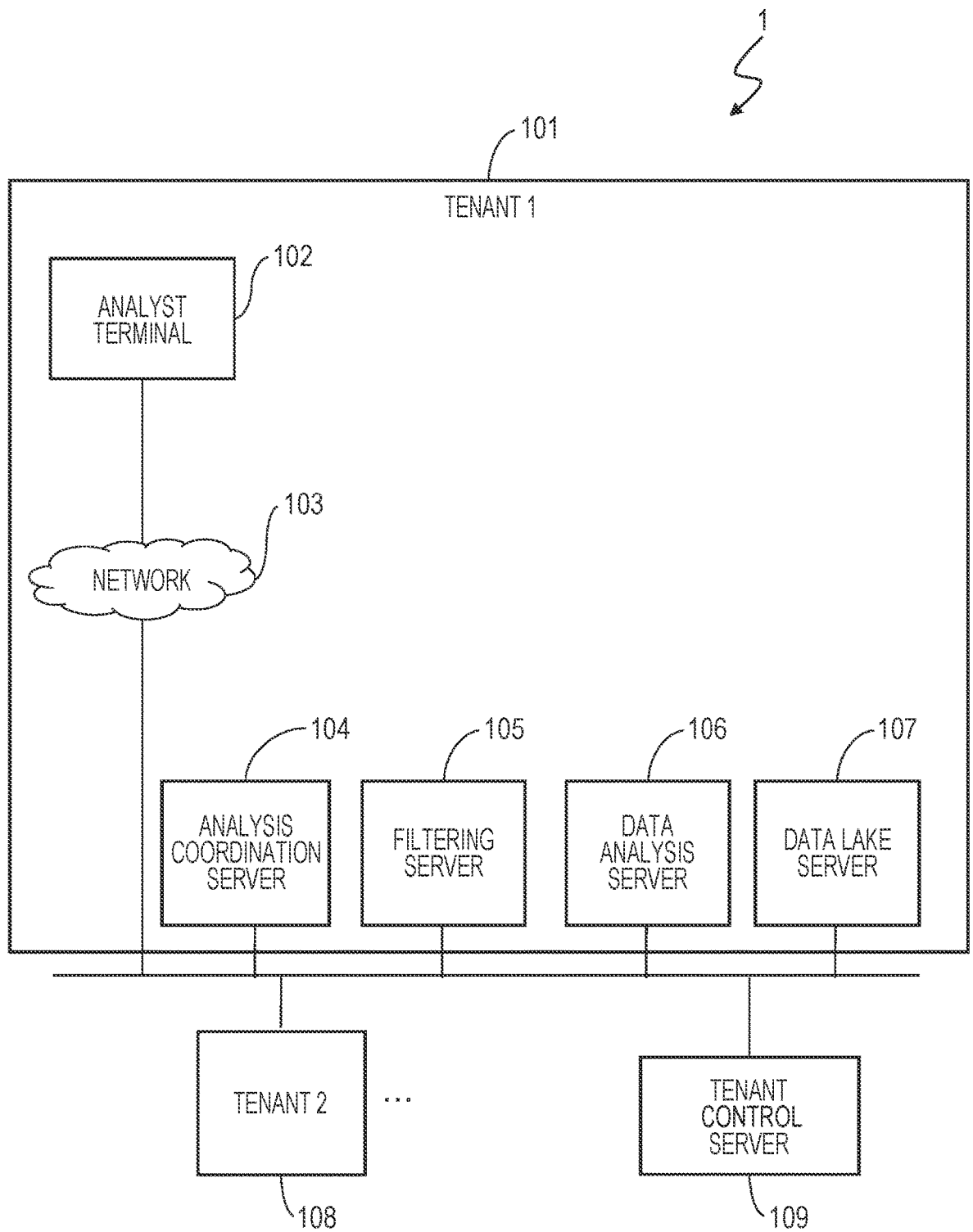
FIG. 1 is a diagram illustrating an overall configuration example of a data analysis system 1 according to an embodiment of the present invention.

First, an overall configuration of a data analysis system 1 according to one embodiment of the present invention will be described. FIG. 1 is a diagram illustrating a configuration example of the entire data analysis system 1. The data analysis system 1 is configured to include an analyst terminal 102, an analysis coordination server 104, a filtering server 105 (filtering unit), a data analysis server 106 (data analysis unit), a data lake server 107 (data storage unit), and a tenant control server 109 (filter control unit), and these elements are communicably connected to each other via a communication network 103.

Among the above elements, constituent units including the analyst terminal 102, the communication network 103, the analysis coordination server 104, the filtering server 105, the data analysis server 106, and the data lake server 107 will be called tenants 101 and 108 (data analysis request sources). Each of the tenants 101 and 108 is configured for each organization such as a company that performs data analysis using the data analysis system 1. Although two tenants of the tenant 1 (a reference sign 101) and the tenant 2 (a reference sign 108) are provided inside in this system 1 in the example of FIG. 1, the system may be configured with three or more tenants or may adopt a configuration where there is only one tenant.

The analyst terminal 102 is a client terminal that is provided in each of the tenants 101 and 108, and can be used to allow an analyst to make an analysis request to the data analysis system 1. The analyst terminal 102 is a general computer having a function of communicating with the communication network 103, and for example, can be configured to have the same configuration as each server to be described later. The analysis coordination server 104 is a server that receives the analysis request from the analyst terminal 102 and controls the entire analysis processing. The filtering server 105 is a server that filters on input data to be analyzed by being called out by the analysis coordination server 104.

The data analysis server 106 is a server that performs analysis processing on the input data that has been filtered by the filtering server 105, by being called out by the analysis coordination server 104.

The data lake server 107 is a data storage that stores raw data to be analyzed. The data lake server 107 is a server that extracts raw data as the input data for analysis and stores analysis result data by being called out by the analysis coordination server 104. The tenant control server 109 is a server that manages analysis information to be executed for each tenant.

The functions of the analysis coordination server 104, the filtering server 105, the data analysis server 106, the data lake server 107, and the tenant control server 109 illustrated in FIG. 1 will be described later with reference to functional block diagrams of FIGS. 3 to 7. In addition, the sequence of analysis processing in the configuration of the entire data analysis system 1 illustrated in FIG. 1 will be described later with reference to FIG. 8.

Figure 2:
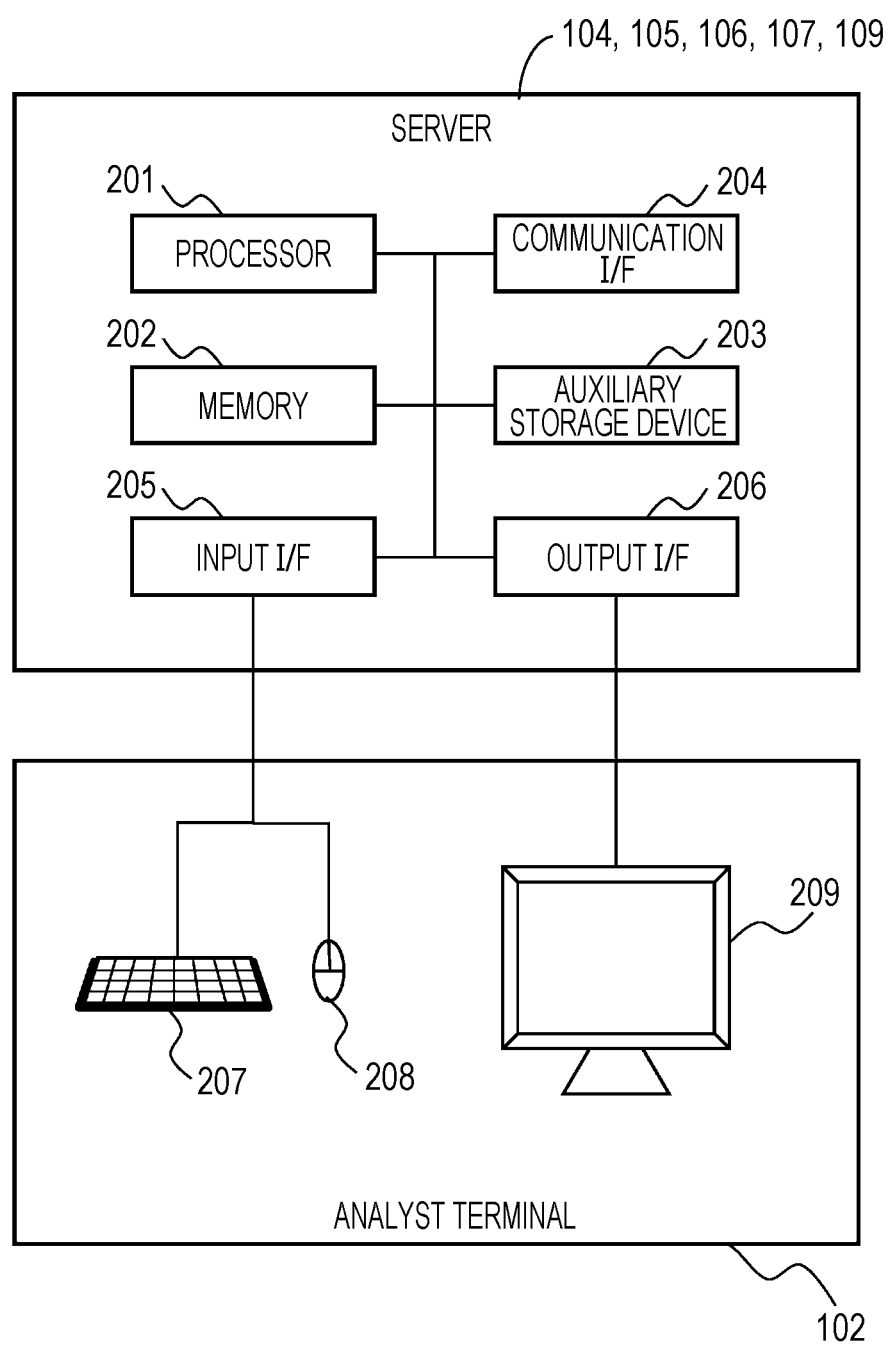
FIG. 2 is a diagram illustrating a hardware configuration example of each server constituting the data analysis system 1 and a configuration example of an analyst terminal connected to each server.

Next, a configuration example of each server will be described. FIG. 2 illustrates a hardware configuration example of each server constituting the data analysis system 1 and a configuration example of the analyst terminal. Each server is configured to include a processor 201, a memory 202, an auxiliary storage device 203, a communication I/F 204, an input I/F 205 that receives data input from a keyboard 207 and a mouse 208 of the analyst terminal 102, and an output I/F 206 which is an interface configured to output and display the data on a display device 209 of the analyst terminal 102.

The processor 201 is an arithmetic device having at least one core such as a central processing unit (CPU) and executes a program stored in the memory 202. As the processor 201 executes a program, a module having a predetermined function is realized. In the following description, when processing is described with a module as a subject, it indicates that the processor 201 executes a program realizing the module.

The memory 202 stores a program executed by the processor 201 and data used by the program. In addition, the memory 202 includes a work area temporarily used by the module. A ROM configured using a nonvolatile storage element and a RAM configured using a volatile storage element or the like are conceivable as the memory 202.

The auxiliary storage device 203 stores the program and the data used by the program. The auxiliary storage device 203 is a large-capacity and nonvolatile storage device, and for example, a hard disk drive (HDD), a solid state drive (SSD), or the like is conceivable. Note that, the program and data stored in the memory 202 may be stored in the auxiliary storage device 203. In this case, the processor 201 loads the program and data from the auxiliary storage device 203, and loads the program and the data into the memory 202.

Figure 3:
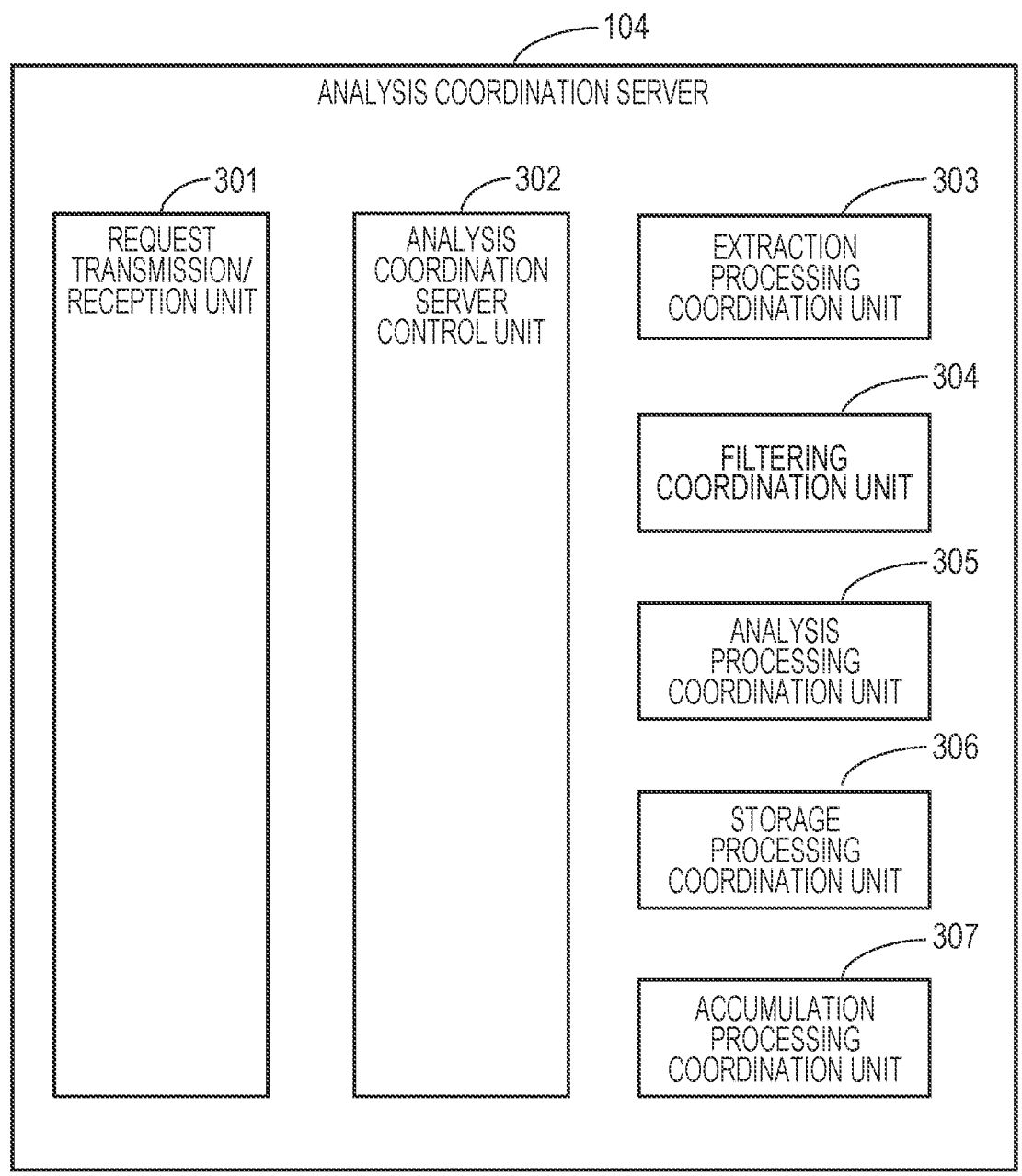
FIG. 3 is a diagram illustrating an example of a functional block of a data analysis coordination server 104.

The communication I/F 204 is a network interface device such as a network interface card (NIC) that controls communication with other devices via the communication network 103 following a predetermined protocol. Note that, the analyst terminal 102 may be configured separately from the server as illustrated in FIG. 2, or may be integrally incorporated in each server. Next, the functions of the respective servers will be described. First, the function of the analysis coordination server 104 will be described. FIG. 3 is a diagram illustrating an example of a functional block of the analysis coordination server 104 illustrated in FIG. 1.

The analysis coordination server 104 is configured to include a request transmission/reception unit 301, an analysis coordination server control unit 302, an extraction processing coordination unit 303, a filter coordination unit 304, an analysis processing coordination unit 305, a storage processing coordination unit 306, and an accumulation processing coordination unit 307.

The request transmission/reception unit 301 has a function of transmitting and receiving data to and from the analyst terminal 102. The analysis coordination server control unit 302 has a function of performing operation control of the analysis coordination server 104. The extraction processing coordination unit 303 has a function of acquiring input data in coordination with the data lake server 107. The filter coordination unit 304 has a function of acquiring filter data which is a result of filtering the input data in coordination with the filtering server 105. The analysis processing coordination unit 305 has a function of acquiring a data analysis processing result based on filter data in coordination with the data analysis server 106. The storage processing coordination unit 306 has a function of storing the data analysis result in the data lake server 107 in coordination with the data lake server 107. The accumulation processing coordination unit 307 has a function of storing a result relating to the filtering in cooperation with the tenant control server 109.

Figure 4:
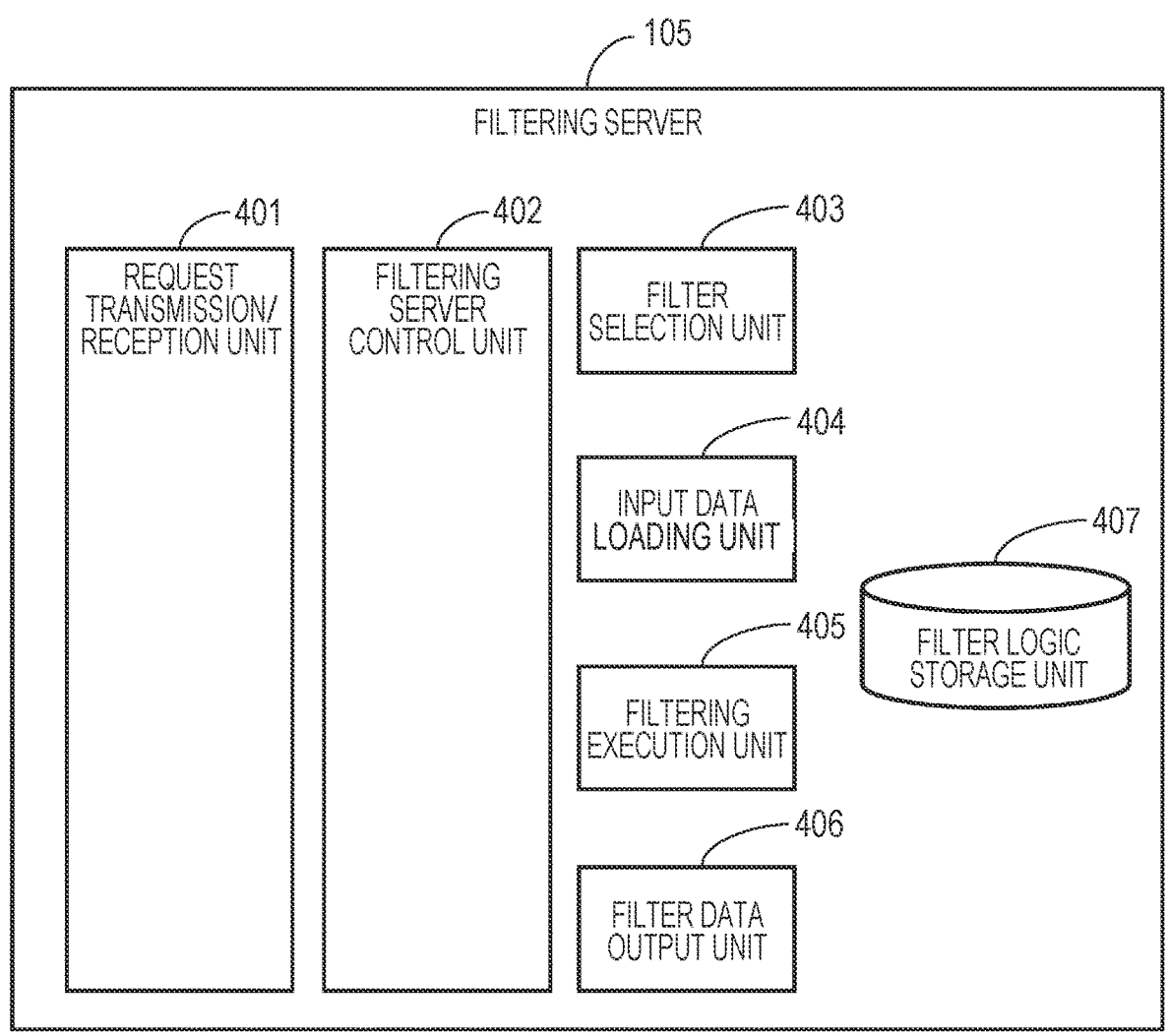
FIG. 4 is a diagram illustrating an example of a functional block of a filtering server 105.

Next, the filtering server 105 will be described. FIG. 4 is a diagram illustrating an example of functional blocks of the filtering server 105 illustrated in FIG. 1. Details of the processing performed by the filtering server 105 will be described later with reference to FIG. 10.

The filtering server 105 is configured to include a request transmission/reception unit 401, a filtering server control unit 402, a filter selection unit 403, an input data loading unit 404, a filtering execution unit 405, a filter data output unit 406, and a filter logic storage unit 407.

Figure 5:
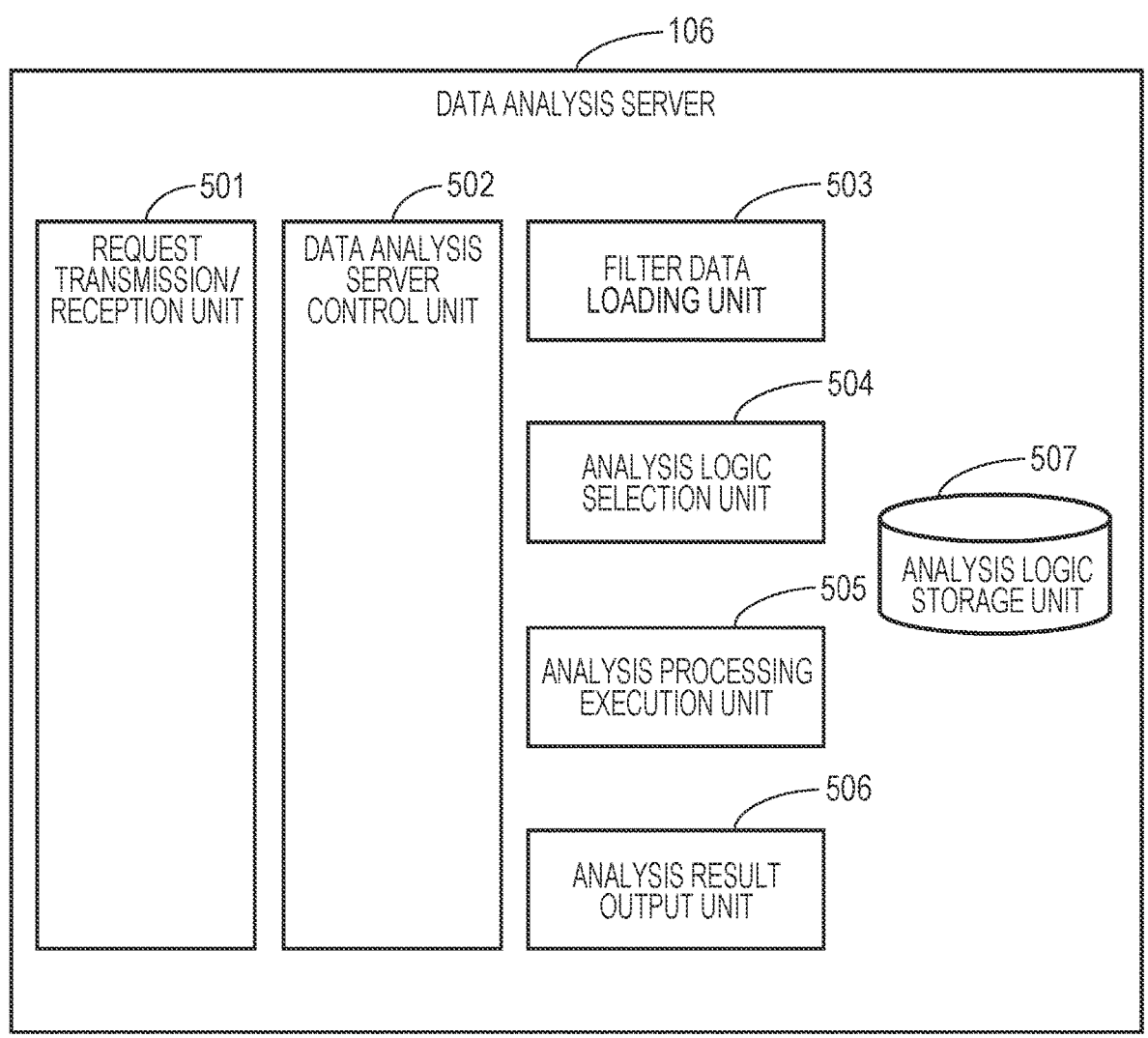
FIG. 5 is a diagram illustrating an example of a functional block of a data analysis server 106.

The request transmission/reception unit 401 has a function of processing a filtering request from the filter coordination unit 304 of the analysis coordination server 104. The filtering server control unit 402 has a function of operation control of the filtering server 105. The filter selection unit 403 has a function of selecting a filter and a filter condition to be used. The input data loading unit 404 has a function of loading input data to be subjected to filtering. The filtering execution unit 405 has a function of filtering input data using a filter logic selected by the filter selection unit 403. The filter data output unit 406 has a function of outputting the filtered input data as filter data. The filter logic storage unit 407 is a storage unit that stores the filter logic executed by the filtering execution unit 405. Next, the data analysis server 106 will be described. FIG. 5 is a diagram illustrating an example of a functional block of the data analysis server 106 illustrated in FIG. 1.

The data analysis server 106 is configured to include a request transmission/reception unit 501, a data analysis server control unit 502, a filter data loading unit 503, an analysis logic selection unit 504, an analysis processing execution unit 505, an analysis result output unit 506, and an analysis logic storage unit 507.

Figure 6:
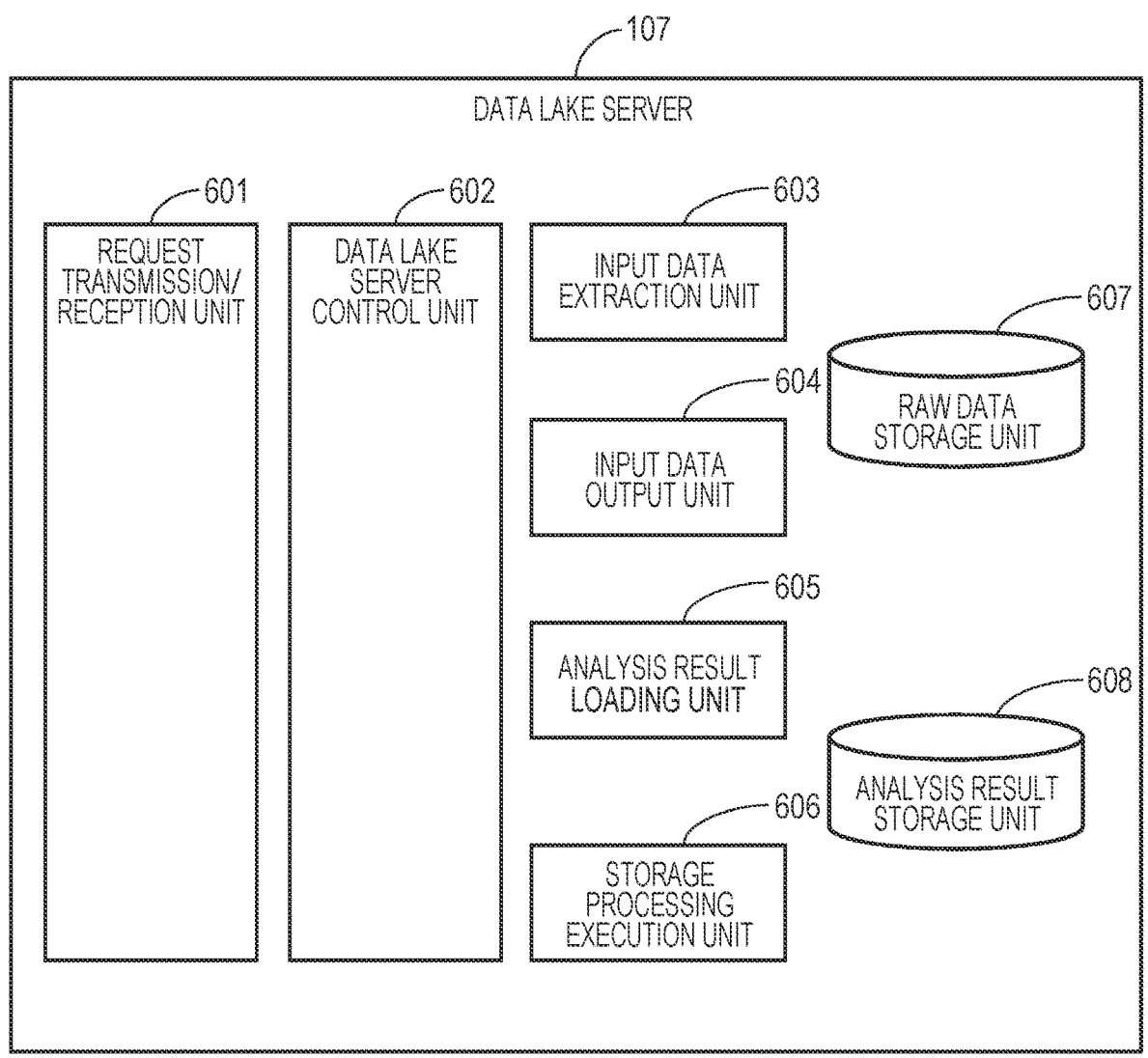
FIG. 6 is a diagram illustrating an example of a functional block of a data lake server 107.

The request transmission/reception unit 501 has a function of processing a data analysis processing request received from the analysis processing coordination unit 305 of the analysis coordination server 104. The data analysis server control unit 502 has a function of performing operation control of the data analysis server 106. The filter data loading unit 503 has a function of loading filter data to be subjected to analysis processing. The analysis logic selection unit 504 has a function of selecting an analysis logic to be used. The analysis processing execution unit 505 has a function of performing analysis processing of filter data by using the analysis logic selected by the analysis logic selection unit 504. The analysis result output unit 506 has a function of outputting a file such that an analysis result loading unit 605 of the data lake server 107 can load the analysis result. The analysis logic storage unit 507 is a storage unit storing the analysis logic to be executed by the analysis processing execution unit 505. Next, the data lake server 107 will be described. FIG. 6 is a diagram illustrating an example of a functional block of the data lake server 107 illustrated in FIG. 1.

The data lake server 107 is configured to include a request transmission/reception unit 601, a data lake server control unit 602, an input data extraction unit 603, an input data output unit 604, an analysis result loading unit 605, a storage processing execution unit 606, a raw data storage unit 607, and an analysis result storage unit 608.

The request transmission/reception unit 601 has a function of processing an input data extraction request from the extraction processing coordination unit 303 of the analysis coordination server 104 and an analysis result storage request from the storage processing coordination unit 306 of the analysis coordination server 104. The data lake server control unit 602 has a function of performing operation control of the data lake server 107. The input data extraction unit 603 has a function of extracting input data to be subjected to filter processing and analysis processing from the raw data storage unit 607 to be described later. The input data output unit 604 has a function of outputting a file such that the filtering server 105 can load the input data extracted by the input data extraction unit 603 from the raw data storage unit 607. The analysis result loading unit 605 has a function of loading an output file of the analysis result output from the analysis result output unit 506 of the data analysis server 106. The storage processing execution unit 606 has a function of storing the analysis result loaded by the analysis result loading unit 605 in the analysis result storage unit 608 to be described later. The raw data storage unit 607 is a storage unit that stores raw data to be subjected to analysis. The analysis result storage unit 608 is a storage unit serving as a storage destination of the analysis result.

Figure 7:
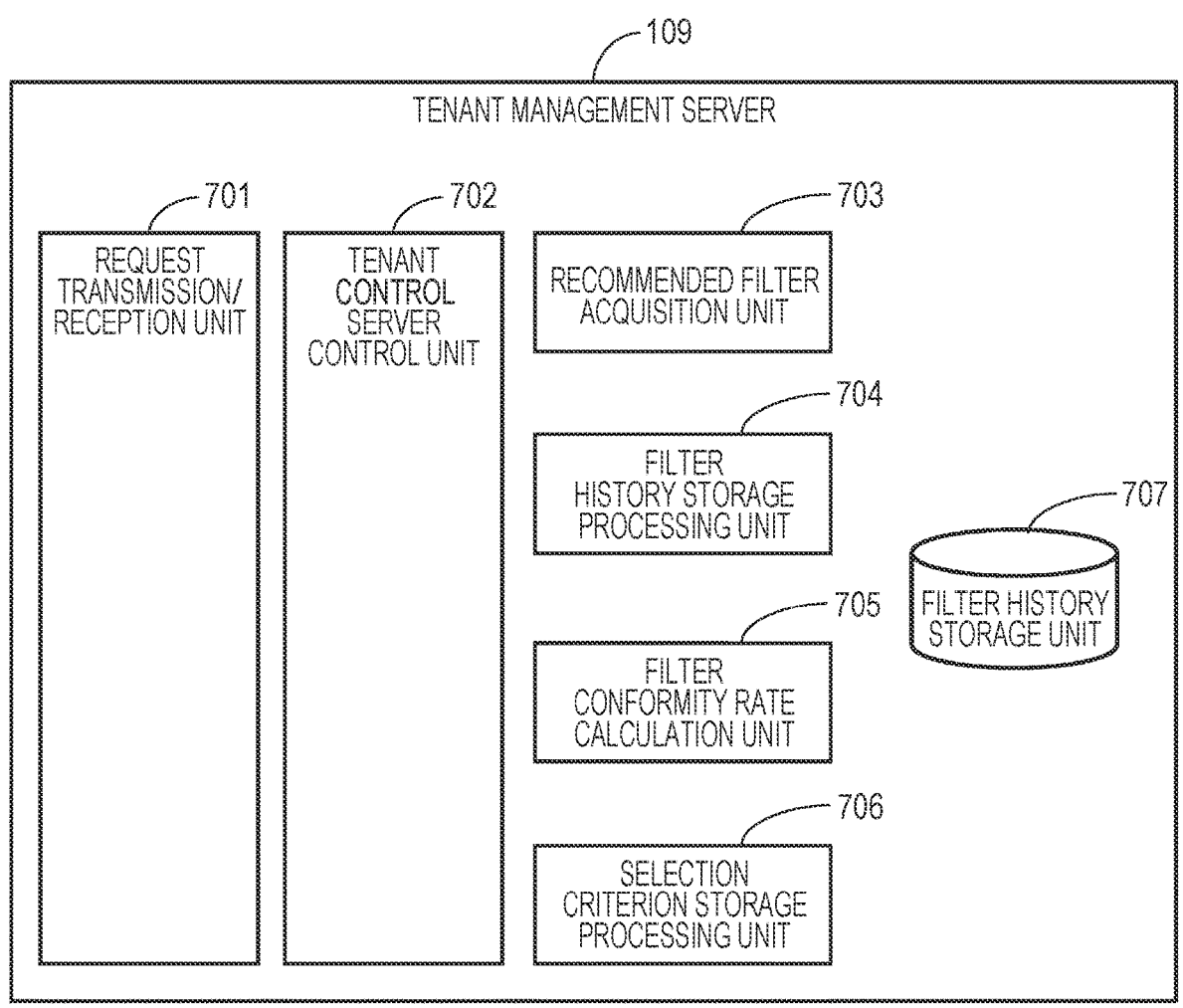
FIG. 7 is a diagram illustrating an example of a functional block of a tenant control server 109.

Next, the tenant control server 109 will be described. FIG. 7 is a diagram illustrating an example of a functional block of the tenant control server 109 illustrated in FIG. 1. The tenant control server 109 is configured to include a request transmission/reception unit 701, a tenant control server control unit 702, a recommended filter acquisition unit 703, a filter history storage processing unit 704, a filter conformity rate calculation unit 705, a selection criterion storage processing unit 706, and a filter history storage unit 707.

The request transmission/reception unit 701 has a function of processing a filter use result accumulation request from the accumulation processing coordination unit 307 of the analysis coordination server 104 and a filter history information acquisition request from the filter selection unit 403 of the filtering server 105. The tenant control server control unit 702 has a function of performing operation control of the tenant control server 109. The recommended filter acquisition unit 703 has a function of acquiring a recommended filter and a recommended filter condition to be used by the filtering server 105. Details of the process of selecting the filter to be used by the recommended filter acquisition unit 703 will be described later with reference to FIG. 11. In addition, details of the process of selecting the filter condition to be used by the filter selection unit 403 will be described later with reference to FIG. 12.

The filter history storage processing unit 704 has a function of storing information on the filter selected by the filtering execution unit 405 of the filtering server 105. The filter conformity rate calculation unit 705 has a function of calculating a filter conformity rate and a filter condition conformity rate to be updated when storing the filter history. Details of a process of calculating the filter conformity rate will be described later with reference to FIG. 14. Details of a process of calculating the filter condition conformity rate will be described later with reference to FIG. 15.

The selection criterion storage processing unit 706 has a function of registering and storing master data to be used as a filter selection criterion such as an analysis purpose and an input data type. The sequence when registering the master serving as the filter selection criterion will be described later with reference to FIG. 9.

The filter history storage unit 707 is a storage unit storing information on a filter, a filter conformity rate, a filter selection criterion, and the like which have been used for each tenant. Details of a process in which the tenant control server 109 calculates the filter conformity rate and updates the used filter information will be described later with reference to FIG. 13.

Figure 8:
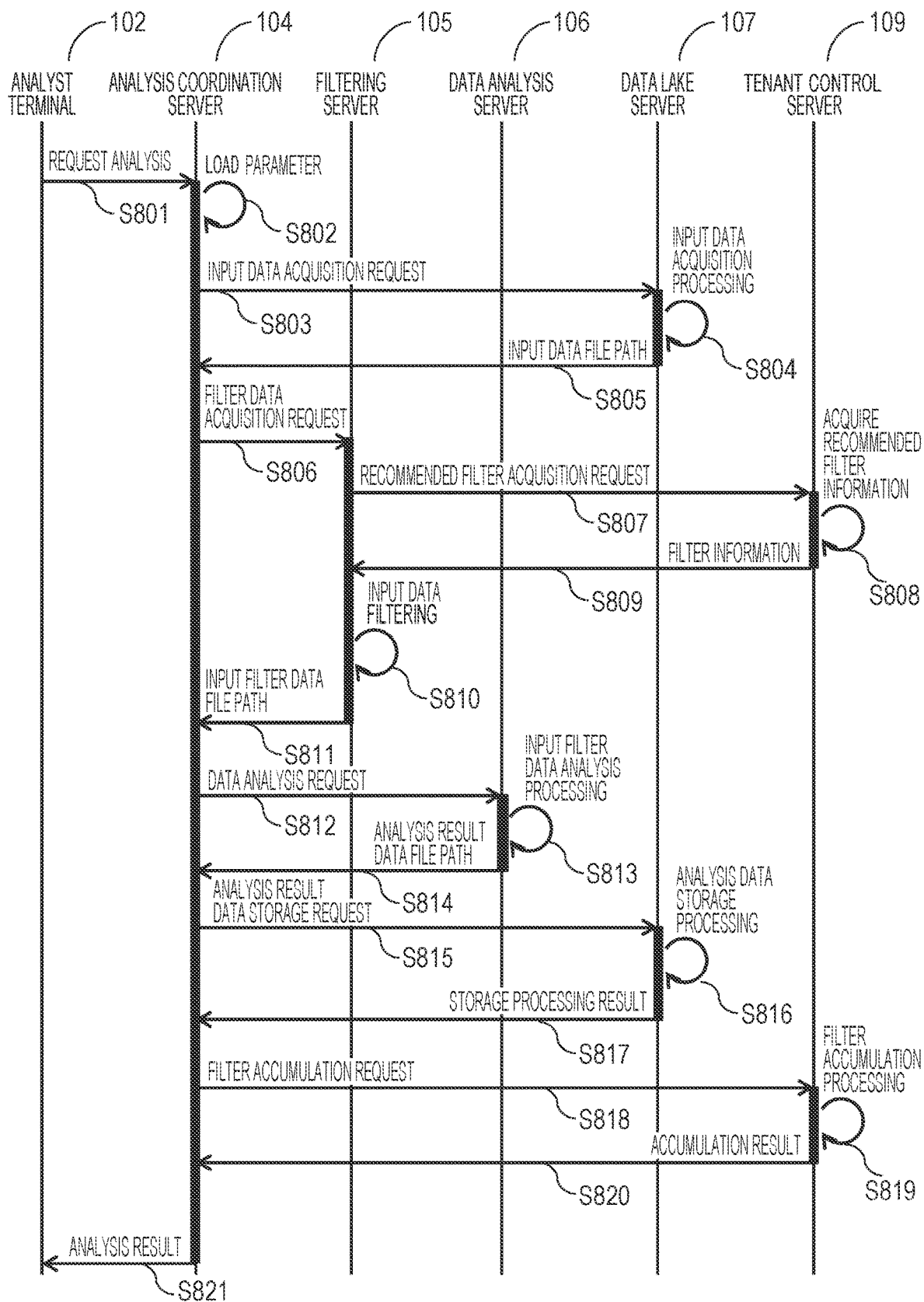
FIG. 8 is an example of a sequence diagram when data analysis is performed by the data analysis system 1.

Next, data processing to be executed by the data analysis system 1 having the above configuration will be described. FIG. 8 is a sequence diagram illustrating an example of a flow of analysis processing performed in the overall configuration diagram of the data analysis system 1 illustrated in FIG. 1. A reference sign "Snnn" (nnn is a number) is an identification code configured to identify a data processing step that is executed in each server or the like included in the data analysis system 1. Hereinafter, a content of data processing executed in each step will be sequentially described.

In S801, a user of the analysis system 1 makes an analysis request to the analysis coordination server 104 using the analyst terminal 102. Input arguments of S801 relating to this analysis request include an item and a range of input data, an analysis purpose such as failure detection and business efficiency improvement, an input data type such as temperature data, humidity data, and sales data, a filter to be used for analysis and a parameter of the filter (hereinafter referred to as a filter condition), an analysis logic, and the like. Hereinafter, the analysis purpose and the input data type will be referred to as filter selection criteria. However, it is possible to omit specifying of a filter and a filter condition when using a filter recommendation function. Note that, the filter selection criterion is an item serving as a determination criterion to perform a recommendation of a filter, and may include any criterion other than the analysis purpose or the input data type. In addition, the filter selection criterion is specified from those preliminarily registered in the tenant control server 109. The pre-registration of the filter selection criterion will be described later with reference to FIG. 9.

In S802, the analysis coordination server 104 that has received an analysis request from the analyst terminal 102 loads parameters of the analysis coordination server 104. The parameters include input data and filter data, a file path of an analysis result and IP addresses of various servers such as the filtering server 105 with which the analysis coordination server 104 communicates, and information on a default filter to be used when the filter and the filter condition are omitted.

In S803, the analysis coordination server 104 makes an input data acquisition request to be analyzed to the data lake server 107. In the input data acquisition request, an item and a range of input data included in the analysis request are inherited.

In S804, the data lake server 107 acquires data matching the item and the range of the input data specified by the input data acquisition request from the raw data storage unit 607 of the data lake server 107, and outputs a file as the input data. A file output destination of the input data may be any device as long as the device is a shared storage unit that the filtering server 105, the data analysis server 106, and the data lake server 107 can freely access. Alternatively, the input data itself may be returned to the processing of S805 to be described later. Note that, the above description applies in the same manner in a step of outputting the input data file without being limited to the case of S804.

In S805, the data lake server 107 returns a path indicating a location of the input data file output as the file in the input data acquisition processing (S804) to the analysis coordination server 104 as a response to the input data acquisition request. Although the data lake server 107 returns the input data file path to the analysis coordination server 104 as an example, the input data acquired from the raw data storage unit 607 of the data lake server 107 may be directly returned to the data lake server 107 without outputting the file. The above description applies in the same manner in other steps of exchanging data using file paths without being limited to the input data file path in S805.

In S806, the analysis coordination server 104 transmits a filter data acquisition request to the filtering server 105. The filter data acquisition request includes the input data file path acquired in S805, the filter, the filter condition, and the filter selection criterion included in the analysis request in S801.

In S807, the filtering server 105 transmits a recommended filter acquisition request to the tenant control server 109 in order to determine a filter to be used. The recommended filter acquisition request includes the filter selection criterion included in the filter data acquisition request. The filter and the filter condition are specified in the filter data acquisition request, and it is possible to omit transmission of the recommended filter acquisition request to the tenant control server 109 when the filter recommendation is unnecessary. In this case, the processing jumps to S811 to be described later.

In S808, the tenant control server 109 executes recommended filter acquisition processing in accordance with an argument of the recommended filter acquisition request from the filter history storage unit 707 of the tenant control server 109. Details of the recommended filter acquisition processing S808 will be described later with reference to FIG. 10.

In S809, the tenant control server 109 that has selected the recommended filter in the recommended filter acquisition processing (S808) returns filter information to the filtering server 105 as a response to the recommended filter acquisition request. The filter information includes the filter and the filter condition.

In S810, the filtering server 105 that has acquired the filter information executes input data filtering based on the input data and the filter information, and outputs a filter result file for the input data as filter data.

In S811, the filtering server 105 returns a file path of the filter data output in the input data filtering (S810) to the analysis coordination server 104 as a response to the filter data acquisition request.

In S812, the analysis coordination server 104 specifies the file path of the input filter data acquired in S811 and the analysis logic acquired by the analysis request of S801 and makes a data analysis request to the data analysis server 106.

In S813, the data analysis server 106 loads the input filter data from the input filter data file path specified by the data analysis request, and performs data analysis of the input filter data using the analysis logic specified by the data analysis request. The data analysis server 106 outputs a result file of the data analysis as an analysis result data.

In S814, the data analysis server 106 returns a file path of the analysis result data to the analysis coordination server 104 as a response to the data analysis request.

In S815, the analysis coordination server 104 specifies the file path of the analysis result data acquired in S814, and transmits an analysis result data storage request to the data lake server 107.

In S816, the data lake server 107 loads the analysis result data from the file path of the analysis result data, and stores the analysis result data in the analysis result storage unit 608 of the data lake server 107.

In S817, the data lake server 107 returns a storage processing result of the data analysis result to the analysis coordination server 104 as a response to the analysis result data storage request.

In S818, the analysis coordination server 104 specifies a filter, a filter condition, and a filter selection criterion which have been used and transmits a filter accumulation request to the tenant control server 109 in order to perform accumulation processing of filters and filter conditions used in the current analysis.

In S819, the tenant control server 109 calculates the filter conformity rate for the specified filter selection criterion, and stores information on the used filter and filter condition in the filter history storage unit 707 of the tenant control server 109. Details of the filter accumulation processing S819 will be described later with reference to FIG. 13. In S820, the tenant control server 109 returns an accumulation result to the analysis coordination server 104 as a response to the filter accumulation request.

In S821, the analysis coordination server 104 returns the analysis result as a response to the analysis request to the analyst terminal 102. With the above sequence, the series of analysis processing based on the analysis request transmitted from the analyst terminal 102 of a certain tenant in the data analysis system 1 is completed.

Figure 9:
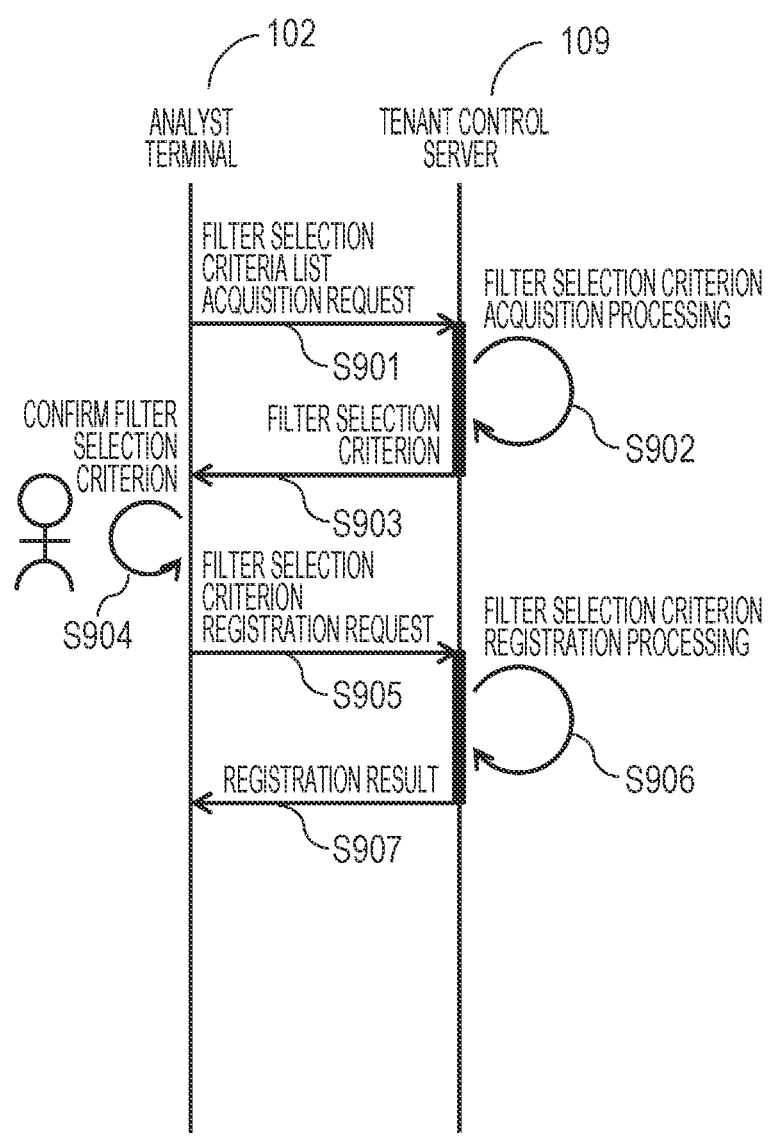
FIG. 9 is an example of a sequence diagram when registering a filter selection criterion.

Next, functions of the tenant control server 109 will be described. FIG. 9 is an example of a sequence diagram when preliminarily registering the filter selection criterion specified by the analysis request in S801 in the tenant control server 109 in the flow of analysis processing executed in the data analysis system 1 illustrated in FIG. 8.

The analyst terminal 102 needs to specify the filter selection criterion when performing the analysis request (S801). In this case, the system cannot determine that it is the same filter selection criterion when wording expressing the relevant filter selection criterion is not unified even if the same filter selection criteria are used. For example, when the analysis purpose is "failure detection", analysts sometimes express the analysis purpose as "failure prediction", but both the analysis purposes are the same.

Therefore, the present embodiment adopts the configuration in which the analyst preliminarily registers the filter selection criteria in the tenant control server 109 and a plurality of analysts can use the unified filter selection criteria.

First, in S901, the analyst terminal 102 transmits a filter selection criteria list acquisition request to the tenant control server 109 in order to confirm the currently registered filter selection criteria. In S902, the tenant control server 109 acquires a list of the filter selection criteria registered in the filter history storage unit 707 of the tenant control server 109. In S903, the tenant control server 109 returns the list of the filter selection criteria acquired in S902 to the analyst terminal 102. In S904, the analyst confirms the list of the filter selection criteria on the analyst terminal 102 that has received the list.

In S905, when a filter selection criterion to be used by the analyst is not registered in the list of the filter selection criteria, a filter selection criteria registration request describing the filter selection criterion and the description thereof is transmitted from the analyst terminal 102 to the tenant control server 109 according to a request of the analyst. In S906, the filter selection criterion and the description thereof, received by the tenant control server 109, are registered in the filter history storage unit 707 of the tenant control server 109. In S907, the tenant control server 109 returns a registration result of S906 to the analyst terminal 102. In S907, the pre-registration of the filter selection criterion is completed.

Figure 10:
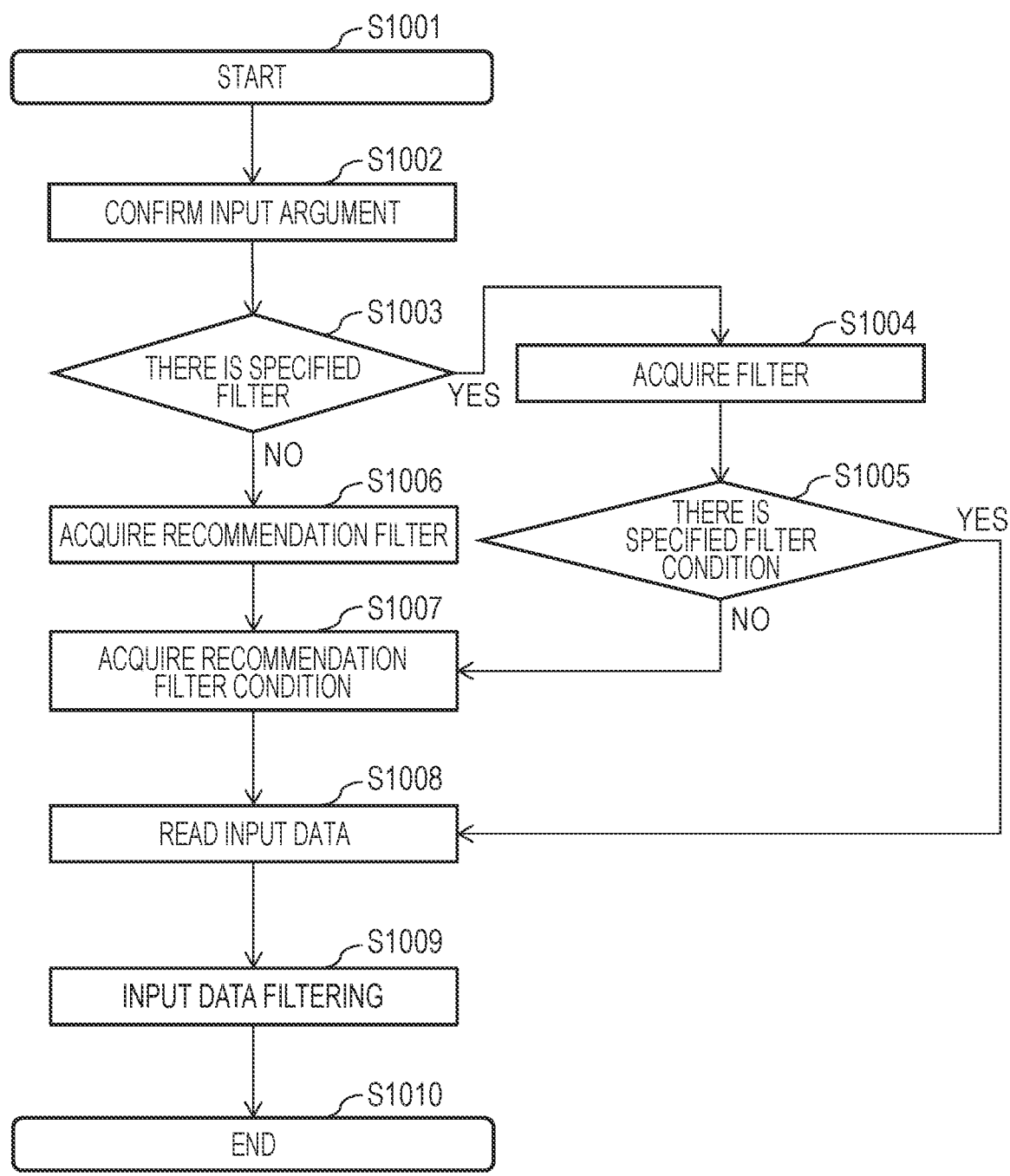
FIG. 10 is a flowchart illustrating an example of an operation of input data filtering.

Next, the data processing executed by the filtering server 105 will be described. FIG. 10 is an example of a flowchart for describing the operation of data processing S807 to S810 to be executed by the filtering server 105 that has received the filter data acquisition request in S806 of FIG. 8. In the data processing illustrated in FIG. 10, the filtering server 105 executes data filtering using the filter acquired by the filter data acquisition request.

S1001 is a step of starting processing. The filtering server 105 which has received the filter data acquisition request illustrated in FIG. 8 starts the filtering of the input data.

In S1002, the filtering server control unit 402 of the filtering server 105 confirms an input argument. The filtering server 105, which has received the filter data acquisition request, confirms the argument of the received request, and acquires a specified filter, a filter condition, and an input data file path.

In S1003, the filtering server control unit 402 of the filtering server 105 determines presence or absence of a specified filter. When it is determined that there is no specified filter (No in S1003), the filtering server control unit 402 acquires a recommended filter from the tenant control server 109 in S1006. A process of acquiring the recommended filter will be described later with reference to FIG. 11.

When it is determined in S1003 that there is a specified filter (Yes in S1003), the filtering server control unit 402 of the filtering server 105 acquires the specified filter (S1004) and determines presence or absence of a specified filter condition (S1005).

When it is determined that there is no specified filter condition (No in S1005), the filter selection unit 403 of the filtering server 105 acquires a recommended filter condition from the tenant control server 109 in S1007. Thereafter, the processing proceeds to S1008.

When it is determined in S1005 that there is a specified filter condition (Yes in S1005), the input data loading unit 404 of the filtering server 105 loads the input data from the input data file path in S1008.

As described above, after acquiring the recommended filter in S1007 or when there is no specified filter condition in S1005, the filtering server control unit 402 of the filtering server 105 executes recommended filter condition acquisition processing (S1007) as the process of acquiring the filter condition for the filter specified in filter data acquisition request or the recommended filter. The recommended filter condition acquisition processing will be described later with reference to FIG. 13. Even when there is no specified filter or specified filter condition, it is possible to acquire the recommended filter and the recommended filter condition in S1006 and S1007, and thus, the filtering server control unit 402 loads input data in S1008.

Next, the filtering execution unit 405 of the filtering server 105 executes filter processing in S1009. The filter processing is executed on the basis of the filter, the filter condition, and the input data acquired in S1003 to S1008.

The input data filtering is ended in S1010. In this manner, it is possible to select an appropriate filter for input data and execute the processing in accordance with the presence or absence of the specified filter and the presence or absence of the filter condition in the filter data acquisition request.

Figure 11:
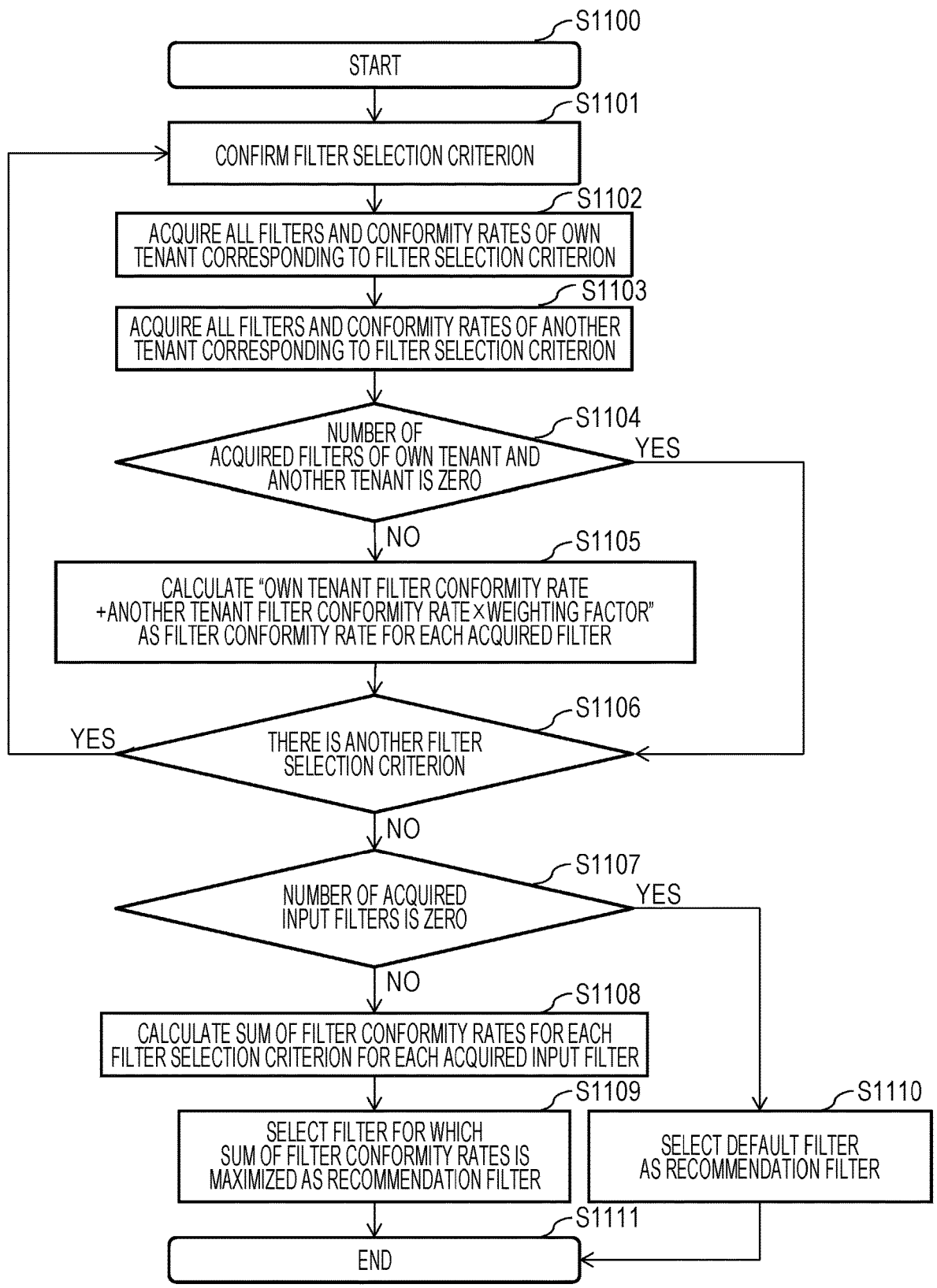
FIG. 11 is a flowchart illustrating an example of an operation of recommended filter acquisition processing.

Next, the recommended filter acquisition processing will be described. FIG. 11 is an example of a flowchart for describing an operation in the tenant control server 109 when the filtering server 105 acquires the recommended filter from the tenant control server 109 in the recommended filter acquisition processing S1004 in FIG. 10.

When starting the processing in S1100, the recommended filter acquisition unit 703 of the tenant control server 109 confirms a filter selection criterion in S1101. The filter selection criterion may be, for example, only the analysis purpose, and/or a plurality of filter selection criteria such as the analysis purpose and the input data type may be provided. When the plurality of filter selection criteria has been specified, the processing up to S1106 to be described later is repeatedly performed for each filter selection criterion.

In S1102, the recommended filter acquisition unit 703 of the tenant control server 109 acquires all filters and filter conformity rates of the own tenant corresponding to the filter selection criterion from the filter history storage unit 707.

In S1103, the recommended filter acquisition unit 703 of the tenant control server 109 acquires all filters and filter conformity rates of another tenant corresponding to the filter selection criterion from the filter history storage unit 707. As the filters and the filter conformity rates of the other tenant are acquired at this step, it is possible to recommend the filter based on the filter conformity rate according to the filter selection criterion even when the own tenant has little know-how on analysis processing. In S1104, the recommended filter acquisition unit 703 of the tenant control server 109 determines whether the number of filters acquired in S1102 and S1103 by the recommended filter acquisition unit 703 is zero.

In S1105, the recommended filter acquisition unit 703 of the tenant control server 109 calculates the filter conformity rate of the filter acquired in S1102 and S1103. When the number of filters acquired in S1102 and S1103 is not zero (No in S1104), "own tenant filter conformity rate+another tenant filter conformity rate×weighting factor" is calculated for each filter acquired in S1105, and the processing proceeds to S1106. The weighting factor can be freely set in the system using a setting file or the like. When the number of filters acquired in S1104 is zero, the recommend filter acquisition unit 703 cannot perform the calculation in S1105. Thus, the processing proceeds to S1106.

In S1106, the recommended filter acquisition unit 703 of the tenant control server 109 determines whether there is another filter selection criterion for which the recommended filter acquisition unit 703 has not yet acquired the filter. When the recommended filter acquisition unit 703 of the tenant control server 109 determines that there is another filter selection criterion for which the filter has not been yet acquired (Yes in S1106), the recommended filter acquisition unit 703 executes the processing from S1101 again. For example, when "failure detection" and "temperature sensor" are specified as the analysis purpose and the input data type, respectively, in the filter selection criteria, processing from S1101, which is the first step, to S1106 is executed for the analysis purposes, "failure detection", and the processing from S1101 to S1106 is executed again for the input data type, "temperature sensor". When all the filter selection criteria have been processed in S1106, the processing proceeds to S1107.

In S1107, the recommended filter acquisition unit 703 of the tenant control server 109 determines whether the number of input filters acquired in S1101 to S1106 is zero.

In S1108, the recommended filter acquisition unit 703 of the tenant control server 109 calculates a sum of filter conformity rates for each filter selection criterion in each filter calculated in S1105. In S1109, the recommended filter acquisition unit 703 of the tenant control server 109 selects a recommended filter using the sum of the filter conformity rates calculated in S1108.

In S1110, the recommended filter acquisition unit 703 of the tenant control server 109 selects the default filter as the recommended filter. This step makes it possible to use the default filter as the recommended filter even when the recommend filter acquisition unit 703 cannot select the recommended filter. In S1111, the recommended filter acquisition processing is ended.

In the above data processing, it is possible to calculate the sum of filter conformity rates when the number of input filters acquired in S1101 to S1106 in S1107 is not zero (No in S1107), and thus, the sum of filter conformity rates for each filter selection criterion is calculated for each input filter acquired in S1108. In S1109, a filter for which the sum of the filter conformity rates is maximized is selected as a result of the calculation to be selected as a recommended filter, whereby the recommended filter acquisition processing is completed (S1111). In addition, the recommended filter acquisition unit 703 cannot select the recommended filter when the number of input filters acquired in S1101 to S1106 in S1107 is zero (Yes in S1107), and thus, the default filter set in advance in the setting file or the like is selected in S1110, and the recommended filter acquisition processing is completed (S1111).

Here, the recommended filter acquisition processing will be described with a specific example. For example, it is considered a case where the data illustrated in FIG. 16 is stored in the filter history storage unit 707 of the tenant control server 109. FIG. 16 illustrates a configuration example of an input filter data table 1601 stored in the filter history storage unit 707 of the tenant control server 109.

Tenant information is stored in a tenant 1602. The tenant information may be a tenant name such as the tenant 1 (101) or the tenant 2 (108) illustrated in the entire system configuration of FIG. 1 or another ID information uniquely identifying a tenant.

The filter name stored in the filter logic storage unit 407 of the filtering server 105 is stored in an input filter 1603. The filter name is an appropriate identification code configured to identify each filter. A selection criterion 1604 stores a filter selection criterion such as an analysis purpose and an input data type.

A content of the filter selection criterion is stored in a criterion content 1605. For example, analysis purposes such as failure detection and business efficiency improvement are stored as the analysis purpose. Input data types such as temperature data and sales data are stored as the input data type. As the selection criterion 1604 and the criterion content 1605, a combination of other appropriate items can be stored in accordance with the request of the tenant.

A conformity rate 1606 stores the conformity rate of the filter according to the filter selection criterion. It is considered that a filter with a higher conformity rate is more effective for the filter selection criterion. The conformity rate 1606 is updated in steps of S1408, S1409, and S1410 in FIG. 14 which will be described later.

An update time and date 1607 stores an update time and date of the filter conformity rate. The update time and date 1607 is updated in accordance with the conformity rate update in steps of S1408, S1409, and S1410 in FIG. 14 which will be described later.

Figure 14:
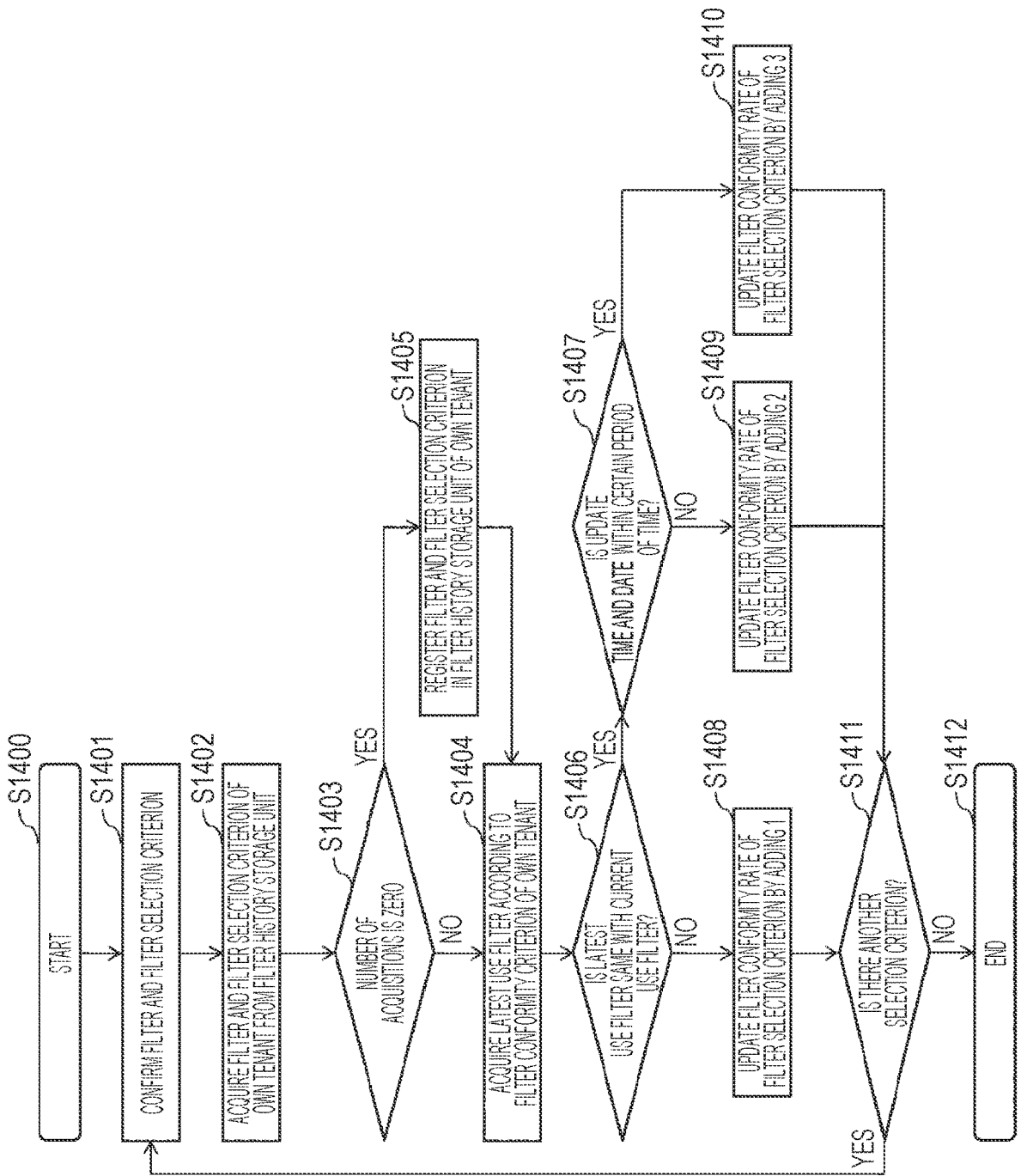
FIG. 14 is a flowchart illustrating an example of an operation of filter conformity rate update processing.

The registration of a record to the input filter data table 1601 can be executed in the step of S1405 in FIG. 14. Note that, the items 1602 to 1607 in FIG. 16 are the minimum items necessary for realizing the system of the present embodiment, and another item may be added, and/or normalization may be performed to divide a table or to be coupled with a filter condition data table 1701 to be described later.

With the example of FIG. 16, a description will be given regarding an operation when acquiring the recommended filter in which the analysis purpose and the input data type have been specified as failure detection and temperature data, respectively, as the filter selection criteria in the analysis request from the tenant 1 of FIG. 1. Note that, the weighting factor in S1105 is set to 0.5.

In FIG. 11, the failure detection of the analysis purpose is first acquired through the confirmation of the filter selection criterion in S1101. In the failure detection of the analysis purpose, a filter A and a filter B are registered in the tenant 1, and the filter B is registered in the tenant 2. Thus, the filter A and a conformity rate of 2, and the filter B and a conformity rate of 10 are acquired in S1102. In S1103, the filter A and a conformity rate of 20 are acquired. As a result, the filter conformity rate in the failure detection of the analysis purpose of the filter A is "own tenant filter conformity rate of 2+another tenant filter conformity rate of 20×0.5=12" in S1105. In addition, the filter conformity rate in the failure detection of the analysis purpose of the tenant B is "own tenant filter conformity rate of 10+another tenant filter conformity rate of 0×0.5=10". In S1106, since there is the temperature data of the input data type which is another filter selection criterion, the processing returns to S1101.

In S1101, the temperature data of the input data type is acquired. In the temperature data of the input data type, the filter A and the filter B are registered in the tenant 1, and no data is registered in another tenant, the filter A and a conformity rate of 14, the filter B and a conformity rate of 8 are acquired in S1102. In addition, the number of acquisitions is zero in S1103. As a result, in S1105, the filter conformity rate in the temperature data of the input data type of the filter A is "own tenant filter conformity rate of 14+another tenant filter conformity of 0×0.5=14". In addition, the filter conformity rate in the temperature data of the input data type of the filter B is "own tenant filter conformity rate of 8+other tenant filter conformity rate of 0×0.5=8". Since there is no further filter selection criterion in S1106, the processing proceeds to S1107. In S1107, since the number of acquired filters is two including the filter A and the filter B, the processing proceeds to S1108. Since the sum of the filter conformity rates for each filter selection criterion for each of the acquired input filters is calculated in S1108, the sum of the conformity rates of the filter A=12+14=26, the sum of the conformity rates of the filter B=10+8=18. In S1109, the filter for which the sum of the filter conformity rates is maximized is the filter A indicating the conformity rate of 26. Thus, the filter A is acquired as a recommended filter in the current analysis request, and the processing is ended.

Figure 12:
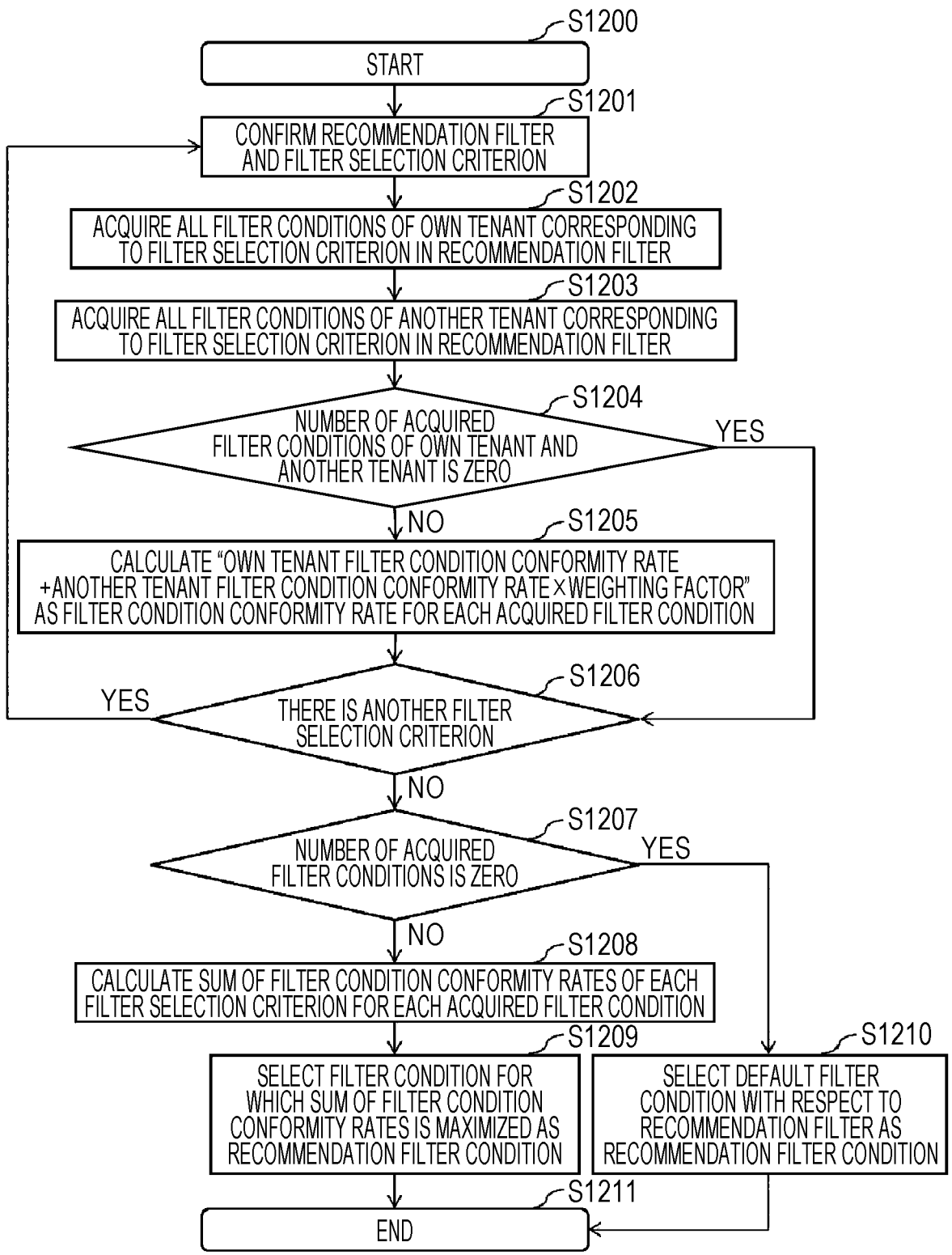
FIG. 12 is a flowchart illustrating an example of an operation of recommended filter condition acquisition processing.

Next, the recommended filter condition acquisition processing will be described. FIG. 12 is an example of a flowchart for describing an operation in the tenant control server 109 when the filtering server 105 acquires the recommended filter condition from the tenant control server 109 in the recommended filter condition acquisition processing S1006 in FIG. 10.

When starting the processing in S1200, the recommended filter acquisition unit 703 of the tenant control server 109 confirms a filter condition selection criterion in S1201. The filter selection criterion may be, for example, only the analysis purpose, or a plurality of filter selection criteria such as the analysis purpose and the input data type may be provided. When the plurality of filter selection criteria has been specified, the processing up to S1206 to be described later is repeatedly performed for each filter selection criterion.

In S1202, the recommended filter acquisition unit 703 of the tenant control server 109 acquires all filter conditions and filter condition conformity rates of the own tenant corresponding to the filter selection criterion in the recommended filter from the filter history storage unit 707.

In S1203, the recommended filter acquisition unit 703 of the tenant control server 109 acquires all filter conditions and filter condition conformity rates of another tenant corresponding to the filter selection criterion in the recommended filter from the filter history storage unit 707. As the filter conditions and the filter condition conformity rates of the other tenant are acquired at this step, it is possible to recommend the filter condition based on the filter condition conformity rate according to the filter selection criterion even when the own tenant has little know-how on analysis processing.

In S1204, the recommended filter acquisition unit 703 of the tenant control server 109 determines whether the number of filter conditions acquired in S1202 and S1203 by the recommended filter acquisition unit 703 is zero.

In S1205, the recommended filter acquisition unit 703 of the tenant control server 109 calculates the filter condition conformity rate of the filter condition acquired in S1202 and S1203. When the number of filter conditions acquired in S1202 and S1203 is not zero, "own tenant filter condition conformity rate+another tenant filter condition conformity rate×weighting factor" is calculated for each filter condition acquired in S1205, and the processing proceeds to S1206. The weighting factor can be freely set by the system using a setting file or the like. In addition, when the number of filter conditions acquired in S1204 is zero, the recommended filter acquisition unit 703 cannot perform the calculation in S1205. Thus, the processing proceeds to S1206.

In S1206, the recommended filter acquisition unit 703 of the tenant control server 109 determines whether there is another filter selection criterion for which the recommended filter acquisition unit 703 has not yet acquired the filter condition. When there is another filter selection criterion for which the filter condition has not been yet acquired, the processing from S1201 is executed again. For example, when failure detection and a temperature sensor are specified as the analysis purpose and the input data type, respectively, in the filter selection criteria, processing from S1201, which is the first step, to S1206 is executed for the failure detection of the analysis purposes, and the processing from S1201 to S1206 is executed again for the temperature sensor of the input data type. When the recommended filter acquisition unit 703 of the tenant control server 109 determines that the determination processing of all the filter selection criteria has finished in S1206, the processing proceeds to S1207.

In S1207, the recommended filter acquisition unit 703 of the tenant control server 109 determines whether the number of input filter conditions acquired in S1201 to S1206 is zero.

In S1208, the recommended filter acquisition unit 703 of the tenant control server 109 calculates a sum of filter condition conformity rates for each filter selection criterion in each filter condition calculated in S1205.

In S1209, the recommended filter acquisition unit 703 of the tenant control server 109 selects a recommended filter condition using the sum of the filter condition conformity rates calculated in S1208.

In S1210, the recommended filter acquisition unit 703 of the tenant control server 109 selects a default filter condition as the recommended filter condition. This step makes it possible to use the default filter condition as the recommended filter condition even when the recommended filter acquisition unit 703 cannot select the recommended filter condition. The recommended filter condition acquisition processing is ended in S1211.

When the recommended filter acquisition unit 703 of the tenant control server 109 determines in S1207 that the number of input filter conditions acquired in S1201 to S1206 is not zero (No in S1207), it is possible to calculate the sum of filter condition conformity rates, and thus, the recommended filter acquisition unit 703 calculates the sum of the filter condition conformity rates for each filter selection criterion for each input filter condition acquired in S1208. In S1209, a filter condition for which the sum of the filter condition conformity rates is maximized is selected as a result of the calculation to be selected as a recommended filter condition, whereby the recommended filter condition acquisition processing is completed (S1211).

When it is determined in S1207 that the number of input filter conditions acquired in S1201 to S1206 is zero (Yes in S1207), the recommended filter acquisition unit 703 cannot select the recommended filter condition. Thus, the default filter condition set in advance in the setting file or the like is selected in S1210, and the recommended filter condition acquisition processing is completed (S1211).

Here, a specific example of the recommended filter condition acquisition processing will be described. For example, a case where the data illustrated in FIG. 17 is stored in the filter history storage unit 707 of the tenant control server 109 is assumed. FIG. 17 illustrates a configuration example of a filter condition data table 1701 stored in the filter history storage unit 707 of the tenant control server 109.

Tenant information is stored in a tenant 1702. The tenant information may be a tenant name such as the tenant 1 (101) or the tenant 2 (108) illustrated in the entire system configuration of FIG. 1 or another ID information uniquely identifying a tenant.

The filter name stored in the filter logic storage unit 407 of the filtering server 105 is stored in an input filter 1703. The filter name is an appropriate identification code configured to identify each filter. A selection criterion 1704 stores a filter selection criterion such as an analysis purpose and an input data type.

A content of the filter selection criterion is stored in a criterion content 1705. For example, analysis purposes such as failure detection and business efficiency improvement are stored as the analysis purpose. Input data types such as temperature data and sales data are stored as the input data type. As the selection criterion 1704 and the criterion content 1705, a combination of other appropriate items can be stored in accordance with the request of the tenant.

In a filter condition conformity rate 1706, a filter condition conformity rate of a filter condition in a filter corresponding to the filter selection criterion is stored. It is considered that a filter condition with a higher conformity rate is more effective when using a filter for the filter selection criterion. The filter condition conformity rate 1706 is updated in steps of S1508, S1509, and S1510 in FIG. 15 to be described later.

An update time and date 1707 stores an update time and date of the filter condition conformity rate. The update time and date 1707 is updated in accordance with the conformity rate update in steps of S1508, S1509, and S1510 in FIG. 15 to be described later. In a condition 1708, parameters for use of the filter are stored.

Figure 15:
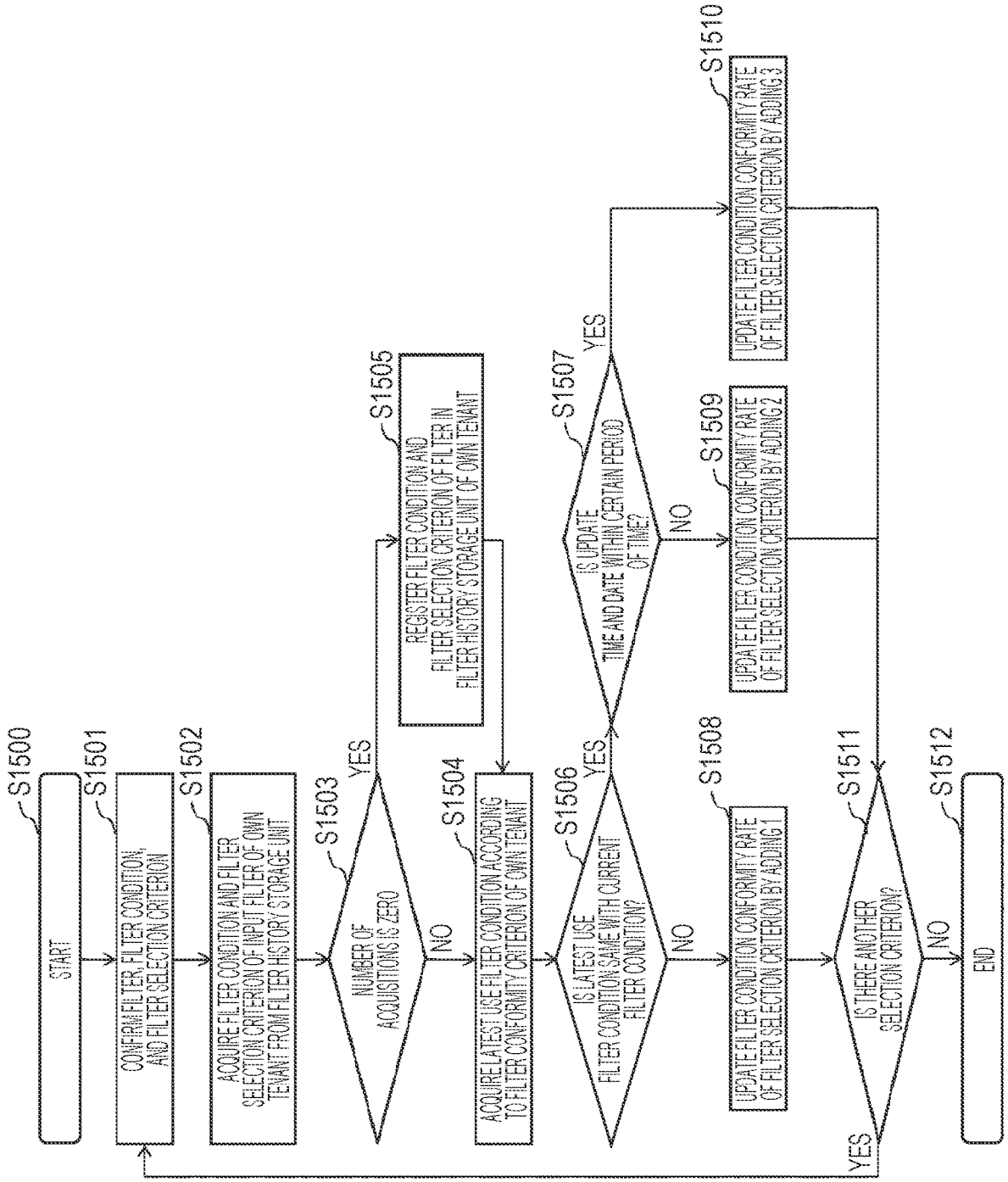
FIG. 15 is a flowchart illustrating an example of the operation of the filter condition conformity rate update processing.

The registration of a record to the filter condition data table 1701 can be executed in the step of S1505 in FIG. 15. Note that, the items 1702 to 1708 in FIG. 17 are the minimum items necessary for realizing the system of the present embodiment, and another item may be added, or normalization may be performed to divide a table or to be coupled with a filter condition data table 1701 to be described later.

With the example of FIG. 17, a description will be given regarding an operation when acquiring the recommended filter condition in which the analysis purpose, the input data type, and the recommended filter have been specified as failure detection, temperature data, and the filter A, respectively, as the filter selection criteria in the analysis request from the tenant 1 of FIG. 1. Note that, the weighting factor in S1205 is 0.5.

In FIG. 12, the failure detection of the analysis purpose of the filter A is first acquired through the confirmation of the recommended filter and the filter selection criterion in S1201. In the failure detection of the analysis purpose of the filter A, $\pm 1\sigma$ and $\pm 2\sigma$ are registered in the tenant 1, and $\pm 1\sigma$ is registered in the tenant 2. Thus, $\pm 1\sigma$ and a conformity rate of 2, and $\pm 2\sigma$ and a conformity rate of 10 are acquired in S1202. In addition, $\pm 1\sigma$ and a conformity rate of 20 are acquired in S1203. As a result, the filter condition conformity rate in the failure detection of the analysis purpose of $\pm 1\sigma$ is "own tenant filter conformity rate of 2+ another tenant filter conformity rate of 20×0.5=12" in S1205. In addition, the filter condition conformity rate in the failure detection of the analysis purpose of $\pm 2\sigma$ is "own tenant filter conformity rate of 10+ another tenant filter conformity rate of 0×0.5=10". In S1206, since there is the temperature data of the input data type which is another filter selection criterion, the processing returns to S1201.

In S1201, the temperature data of the input data type in the filter A is acquired. In the temperature data of the input data type of the filter A, $\pm 2\sigma$ is registered in the tenant 1, and no data is registered in another tenant, $\pm 2\sigma$ and a conformity rate of 14 are acquired in S1202. In addition, the number of acquisitions is zero in S1203. As a result, in S1205, the filter condition conformity rate in the temperature data of the input data type of $\pm 2\sigma$ is "own tenant filter condition conformity rate of 14+another tenant filter condition conformity rate of 0×0.5=14". Since there is no further filter selection criterion in S1206, the processing proceeds to S1207. In S1207, since the number of acquired filter conditions is two including $\pm 1\sigma$ and $\pm 2\sigma$, the processing proceeds to S1208. Since the sum of the filter condition conformity rates for each filter selection criterion for each of the acquired input filter conditions is calculated in S1208, the sum of the conformity rates of $\pm 1\sigma$=12, the sum of the conformity rates of $\pm 2\sigma$=10+14=24. In S1209, the filter condition for which the sum of the filter condition conformity rates is maximized is the conformity rate of 24 of $\pm 2\sigma$, the processing is ended with $\pm 2\sigma$ as the recommended filter condition in the current analysis request. In this manner, it is possible to select the filter condition suitable for the content of the analysis request by the recommended filter condition acquisition processing.

Figure 13:
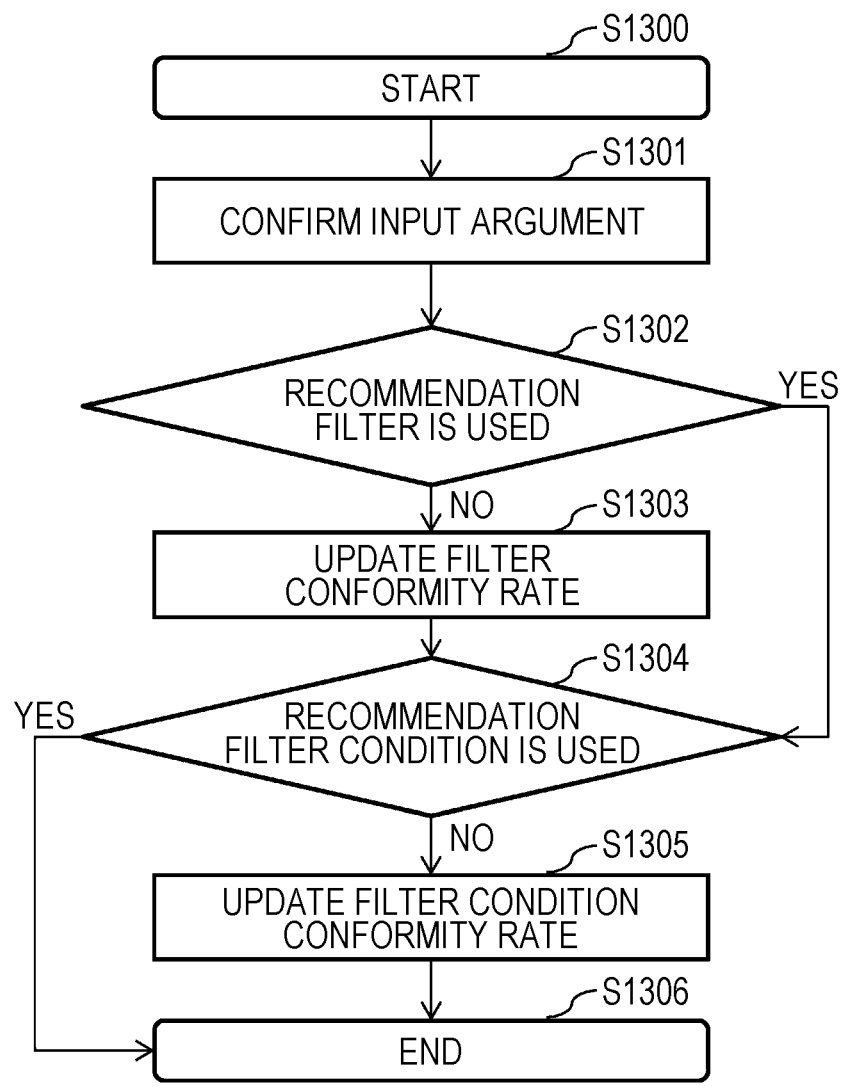
FIG. 13 is a flowchart illustrating an example of an operation of filter accumulation processing.

Next, the filter accumulation processing in the present embodiment will be described. FIG. 13 is an example of a flowchart for describing an operation of the filter accumulation processing (S819) of the tenant control server 109 in FIG. 8. In the filter accumulation processing, information on the used filter and filter condition is stored in the filter history storage unit 707 of the tenant control server 109.

When the processing is started in S1300, the tenant control server control unit 702 of the tenant control server 109 confirms an input argument in S1301. The tenant control server 109, which has received the filter accumulation request (S818), confirms the argument of the received request and acquires a specified filter, a filter condition, and a filter conformity criterion.

In S1302, the filter history storage processing unit 704 of the tenant control server 109 determines whether a recommended filter has been used in the current analysis processing (whether a filter has been specified). In S1303, the filter conformity rate calculation unit 705 of the tenant control server 109 calculates a filter conformity rate, and the filter history storage processing unit 704 performs update processing.

S1304 is a step in which the filter history storage processing unit 704 of the tenant control server 109 determines whether a recommended filter condition has been used in the current analysis processing (whether a filter condition has been specified).

S1305 is a step in which the filter conformity rate calculation unit 705 of the tenant control server 109 calculates a filter condition conformity rate, and the filter history storage processing unit 704 performs update processing.

When the recommended filter is not used (when the filter has been specified in the analysis processing, No in S1302), the filter history storage processing unit 704 performs filter conformity rate update processing (S1303). When the recommended filter is used (Yes in S1302), the filter conformity rate update processing (S1303) is skipped, and S1304 is performed.

Subsequently, whether to use the recommended filter condition (presence or absence of the specified filter condition) is confirmed in S1304. When the recommended filter condition is not used (when the filter condition has been specified in the analysis processing, No in S1304), the filter history storage processing unit 704 performs filter condition conformity rate update processing (S1305), and the processing is ended (S1306). When the recommended filter condition is used (Yes in S1304), the recommended filter condition conformity rate update processing (S1305) is skipped, and the processing is ended (S1306). Hereinafter, a description will be given regarding the recommendation filter conformity rate update processing S1303 with reference to FIG. 14 and the recommended filter condition conformity rate update processing S1305 with reference to FIG. 15. FIG. 14 illustrates an example of a flowchart for describing an operation of the filter conformity rate update processing S1303 in FIG. 13.

In S1401, the filter history storage processing unit 704 of the tenant control server 109 acquires the filter and the filter selection criterion specified in the confirmation of the input argument (S1301) in FIG. 13 as the confirmation of the specified filter and filter selection criterion. When the plurality of filter selection criteria has been specified, the processing up to S1411 to be described later is repeatedly performed for each filter selection criterion.

In S1402, the filter history storage processing unit 704 of the tenant control server 109 performs a process of acquiring filter information of the own tenant from the filter history storage unit 707 of the tenant control server 109 using the specified filter and filter selection criterion as a key.

In S1403, the filter history storage processing unit 704 of the tenant control server 109 determines whether the number of acquisitions of the filter information acquired in S1402 is zero. When the number of acquisitions is zero (Yes in S1403), the specified filter and filter selection criterion are not registered in the filter history storage unit 707, and thus, the processing proceeds to S1405 in order to perform the registration processing in the filter history storage unit 707. When the number of acquisitions is not zero (No in S1403), the filter and the filter conformity criterion have already been registered in the own tenant, the processing in S1405 is not performed and the processing proceeds to S1404. In S1404, the filter history storage processing unit 704 of the tenant control server 109 acquires a latest use filter according to the filter selection criterion of the own tenant.

In S1405, the filter history storage processing unit 704 of the tenant control server 109 registers the specified filter and filter selection criterion acquired in S1401 as own tenant information.

In S1406, the filter history storage processing unit 704 of the tenant control server 109 determines whether the latest use filter according to the filter selection criterion of the own tenant acquired in S1404 is the same filter as a filter currently specified in S1401.

In S1407, the filter history storage processing unit 704 of the tenant control server 109 determines whether an update time and date of the latest use filter according to the filter selection criterion of the own tenant acquired in S1404 is within a certain period of time.

S1408 is a step in which the filter conformity rate calculation unit 705 of the tenant control server 109 calculates the current filter conformity rate+1 as an increment of the filter conformity rate of the filter selection criterion, and the filter history storage processing unit 704 updates the filter history storage unit 707.

In S1409, the filter conformity rate calculation unit 705 of the tenant control server 109 calculates the current filter conformity rate+2 as an increment of the filter conformity rate of the filter selection criterion, and the filter history storage processing unit 704 performs the update processing of the filter history storage unit 707.

In S1410, the filter conformity rate calculation unit 705 of the tenant control server 109 calculates the current filter conformity rate+3 as an increment of the filter conformity rate of the filter selection criterion, and the filter history storage processing unit 704 performs the update processing of the filter history storage unit 707.

In general, when performing data analysis, filter processing of input data is subjected to trial-and-error by a plurality of filters and an optimum filter according to filter selection criterion is selected. At this time, when a filter conforms to the filter selection criterion, it is considered that trial and error is to be performed again by changing the filter condition without changing the filter, and thus, filters that are continuously used are considered to have a high conformity rate with respect to the filter selection criterion. Therefore, when the filters are not the same in S1406 (No in S1406), the filter conformity rate of the filter selection criterion of the specified filter is added by one to be updated. When the filters are the same (Yes in S1406), the update time and date of the use filter is confirmed in S1407. When the update time and date is not within a certain period (No in S1407), two is added to the filter conformity rate of the filter selection criterion in S1409. In addition, when the update time and date is within the certain period (Yes in S1407), three is added to the filter conformity rate of the filter selection criterion in S1410. Note that, the values to be used for updating are examples, and it suffices if the weighting is performed such that a value to be updated in S1408<a value to be updated in S1409<a value to be updated in S1410. With the steps of S1406 and S1407, the filter conformity rate can be efficiently set in accordance with the usage history. In addition, as the filter conformity rate is updated with the steps of S1408, S1409, and S1410, not only the know-how on the analysis processing of own tenant is accumulated but also it is possible to use the know-how on the analysis processing when analysts of other tenants perform analysis processing, and thus, it is possible to expect the use of the know-how as know-how of the entire analysis system.

In S1411, the filter history storage processing unit 704 of the tenant control server 109 determines whether there is another filter selection criterion for which the filter conformity rate has not been updated yet. When there is another filter selection criterion for which the filter conformity rate has not been yet updated (Yes in S1411), the processing from S1401 is executed again. When there is no other filter selection criterion for which the filter conformity rate has not been updated (No in S1411), the processing is ended in S1412.

Here, for example, a case where the input filter data table 1601 of FIG. 16 is stored in the filter history storage unit 707 of the tenant control server 109 is assumed. In this example, when it is assumed that the analysis purpose is failure detection, the input data type is temperature data, the certain period of S1407 is 24 hours, and the tenant 1 specifies the filter A to perform analysis processing at 12:00 on Mar. 20, 2017, a latest use filter of the failure detection as the analysis purpose of the tenant 1 is the filter A, and an update time and date is 11:00 on Mar. 20, 2017, which falls within 24 hours. Thus, a filter conformity rate of the failure detection as the analysis purpose of the filter A of the tenant 1 is 2+3=5. Subsequently, a latest use filter of the temperature data as the input data type of the tenant 1 is the filter B, and thus, a filter conformity rate of the temperature data as the input data type of the filter A of the tenant 1 is 14+1=15. In this manner, the analyst who uses the data analysis system 1 of the present embodiment can use a filter having a higher conformity rate for input data in accordance with the analysis purpose.

Next, the filter condition conformity rate update processing will be described. FIG. 15 illustrates an example of a flowchart for describing an operation of the filter condition conformity rate update processing S1305 in FIG. 13.

When the processing is started in S1500, the filter history storage processing unit 704 of the tenant control server 109 acquires the filter, the filter condition, and the filter selection criterion specified in the confirmation of the input argument (S1301) in FIG. 13 as the confirmation of the specified filter, filter condition, and filter selection criterion in S1501. When the plurality of filter selection criteria has been specified, the processing up to S1511 to be described later is repeatedly performed for each filter selection criterion.

In S1502, the filter history storage processing unit 704 of the tenant control server 109 performs a process of acquiring filter information of the own tenant from the filter history storage unit 707 of the tenant control server 109 using the specified filter, filter condition, and filter selection criterion as a key.

In S1503, the filter history storage processing unit 704 of the tenant control server 109 determines whether the number of acquisitions of the filter information acquired in S1502 is zero. When the number of acquisitions is zero (Yes in S1503), the specified filter, filter condition, and filter selection criterion are not registered in the filter history storage unit 707, and thus, the processing proceeds to processing in S1505 in order to perform the registration processing in the filter history storage unit 707. When the number of acquisitions is not zero (No in S1503), the filter condition and the filter conformity criterion have already been registered in the own tenant, the processing in S1505 is not performed and the processing proceeds to S1504.

In S1504, the filter history storage processing unit 704 of the tenant control server 109 acquires a latest use filter condition according to the filter selection criterion of the own tenant.

In S1505, the filter history storage processing unit 704 of the tenant control server 109 registers the specified filter, filter condition, and filter selection criterion acquired in S1501 as own tenant information.

In S1506, the filter history storage processing unit 704 of the tenant control server 109 determines whether the latest use filter condition according to the filter selection criterion of the own tenant acquired in S1504 is the same filter condition as a filter condition currently specified in S1501.

In S1507, the filter history storage processing unit 704 of the tenant control server 109 determines whether an update time and date of the latest use filter condition according to the filter selection criterion of the own tenant acquired in S1504 is within a certain period of time.

In S1508, the filter conformity rate calculation unit 705 of the tenant control server 109 calculates the current filter condition conformity rate+1 as an increment of the filter condition conformity rate of the filter selection criterion, and the filter history storage processing unit 704 performs the update processing of the filter history storage unit 707.

In S1509, the filter conformity rate calculation unit 705 of the tenant control server 109 calculates the current filter condition conformity rate+2 as an increment of the filter condition conformity rate of the filter selection criterion, and the filter history storage processing unit 704 performs the update processing of the filter history storage unit 707.

In S1510, the filter conformity rate calculation unit 705 of the tenant control server 109 calculates the current filter condition conformity rate+3 as an increment of the filter condition conformity rate of the filter selection criterion, and the filter history storage processing unit 704 performs the update processing of the filter history storage unit 707.

When the latest use filter condition is not the same in S1506 (No in S1506), the filter condition conformity rate of the filter selection criterion of the specified filter condition is added by one to be updated. When the latest use filter condition is the same (Yes in S1506), the update time and date of the use filter condition is confirmed in S1507. When the update time and date is not within a certain period (No in S1507), two is added to the filter condition conformity rate of the filter selection criterion in S1509. In addition, when the update time and date is within the certain period (Yes in S1507), three is added to the filter condition conformity rate of the filter selection criterion in S1510. Note that, the values to be used for updating are examples, and it suffices if the weighting is performed such that a value to be updated in S1508<a value to be updated in S1509<a value to be updated in S1510. As the filter condition conformity rate is updated with the steps of S1508, S1509, and S1510, not only the know-how on the analysis processing of own tenant is accumulated but also it is possible to use the know-how on the analysis processing when analysts of other tenants perform analysis processing, and thus, it is possible to expect the use of the know-how as know-how of the entire analysis system.

In S1511, the filter history storage processing unit 704 of the tenant control server 109 determines whether there is another filter selection criterion for which the filter condition conformity rate has not been updated yet. When there is another filter selection criterion for which the filter condition conformity rate has not been yet updated (Yes in S1511), the filter history storage processing unit 704 executes the processing from S1501 again. When there is no other filter selection criterion for which the filter condition conformity rate has not been updated (No in S1511), the processing is ended in S1512.

Here, for example, a case where data illustrated in the filter condition data table 1701 of FIG. 17 is stored in the filter history storage unit 707 of the tenant control server 109 is assumed. In this example, when it is assumed that the analysis purpose is failure detection, the input data type is temperature data, and the certain period of S1507 is 24 hours, and the tenant 1 specifies ±2σ of the filter A and performs analysis processing at 12:00 on Mar. 20, 2017, a latest use filter condition of the filter A of the failure detection as the analysis purpose of the tenant 1 is ±2σ, and an update time and date is 11:10 on Mar. 20, 2017, which falls within 24 hours. Thus, a filter condition conformity rate of ±2σ as the analysis purpose of the filter A of the tenant 1 is 10+3=13. Subsequently, a latest use filter condition of the temperature sensor as the input data type of the filter A of the tenant 1 is ±2σ, and the update time and date is 15:00:10 on Feb. 1, 2017, which indicates that the update was performed over 24 hours ago. Thus, a filter condition conformity rate of the temperature data as the input data type of ±2σ of the filter A of the tenant 1 is 14+2=16. In this manner, the analyst who uses the data analysis system 1 of the present embodiment can use a filter condition having a higher conformity rate for input data in accordance with the analysis purpose.

According to the data analysis system according to the embodiment of the present invention described above, the filtering logic is stored on the filtering server. Thus, it is possible to filter the input data without correcting an extraction logic of the input data when trial and error is performed by performing analysis processing a plurality of times while changing the filter to be used, and it is possible to reduce the number of SI steps. In addition, since it is possible to select an appropriate filter by recommendation of the filter to be used, it is possible to reduce the number of times of trial and error of data analysis processing, and to achieve smooth introduction for commercialization of data analysis processing.

Although the present disclosure has been described with reference to example embodiments, those skilled in the art will recognize that various changes and modifications may be made in form and detail without departing from the spirit and scope of the claimed subject matter.

What is claimed is:

1. A data analysis system that executes data analysis in response to a data analysis request from a plurality of data analysis request sources, the data analysis system comprising:
   at least one processor;
   at least one memory;
   a filtering unit that filters input data by applying a predetermined filter to the input data;
   a data analysis unit that analyzes the filtered input data;
   a data storage that stores the input data and result data as data that has been analyzed; and
   a filter control unit that records application history of a filter applied in response to the data analysis request, and refers to the filter application history for a new data analysis request to select a filter suitable for data analysis to be executed, and transfers the selected filter to the filtering unit as the predetermined filter,
   wherein the filter control unit records a filter conformity rate, which is an index indicating a degree of conformity of a filter in data analysis processing executed on a type of each of the filters, and a filter condition for each of stored filters in association with a filter selection criterion and a filter selection criterion content included in the data analysis request for each of the data analysis request sources,
   wherein the filter conformity rate is calculated as a sum of a conformity rate recorded for a data analysis request source of a data analysis request to be processed and a corrected conformity rate, obtained by multiplying a conformity rate recorded for another data analysis request source by a predetermined weighting factor, for each extracted filter, and
   wherein the filter control unit selects a filter having a maximum sum of filter conformity rates of the extracted filters as a recommended filter.

2. The data analysis system according to claim 1, wherein the filter control unit stores a default filter to be selected when a filter conforming to filter selection criteria specified in the data analysis request is not extracted.

3. The data analysis system according to claim 2, wherein the filter selection criteria include a filter type to be applied to the input data and a filter condition to be used when the filter executes filter processing of the input data.

4. The data analysis system according to claim 1, wherein the filter control unit has a function of updating the conformity rate for the filter type and the filter condition when selecting a filter based on a data analysis request, and performs updating so as to increase the conformity rate most when an identical filter type or filter condition is specified from an identical data analysis request source and updating of the conformity rate has been executed within a certain period.

5. The data analysis system according to claim 1, wherein the filter control unit extracts all filters having the filter type and the filter condition corresponding to the filter selection criteria based on the filter selection criteria included in the data analysis request received from the data analysis request source.

6. The data analysis system according to claim 1, wherein a the filter condition conformity rate is calculated as a sum of a filter condition conformity rate recorded for a data analysis request source of a data analysis request to be processed and a corrected filter condition conformity rate, obtained by multiplying a filter condition conformity rate recorded for another data analysis request source by a predetermined weighting factor, for each extracted filter condition.

7. The data analysis system according to claim 1, wherein the filter control unit stores a default filter to be selected when a filter conforming to filter selection criteria specified in the data analysis request has not been extracted,
   the filter selection criteria include a type of a filter to be applied to input data and a filter condition to be used when the filter performs filter processing of the input data,
   the filter control unit has a function of updating the conformity rate for the filter type and the filter condition when selecting a filter based on a data analysis request, and performs updating so as to increase the conformity rate most when an identical filter type or filter condition is specified from an identical data analysis request source and updating of the conformity rate has been executed within a certain period, and
   the filter control unit extracts all filters having the filter type and the filter condition corresponding to the filter selection criteria based on the filter selection criteria included in the data analysis request received from the data analysis request source, and
   a filter condition conformity rate is calculated as a sum of a filter condition conformity rate recorded for a data analysis request source of a data analysis request to be processed and a corrected filter condition conformity rate, obtained by multiplying a filter condition conformity rate recorded for another data analysis request source by a predetermined weighting factor, for each extracted filter condition.

8. A data analysis method for executing data analysis in response to a data analysis request from a plurality of data analysis request sources, a computer comprising a processor and a memory stores input data to be analyzed for each of the data analysis request sources and an application history of a filter applied in response to the data analysis request, the method causing the computer to execute:
   receiving the data analysis request to extract the input data to be analyzed;

referring to the filter application history for the data analysis request to select a filter suitable for data analysis to be executed;

applying the selected filter to the input data to perform filtering of the input data;

performing analysis processing of the filtered input data;

storing result data which is the analyzed data;

recording a filter conformity rate, which is an index indicating a degree of conformity of a filter in data analysis processing executed on a type of each of the filters, and a filter condition for each of stored filters in association with a filter selection criterion and a filter selection criterion content included in the data analysis request for each of the data analysis request sources, calculating the filter conformity rate as a sum of a conformity rate recorded for a data analysis request source of a data analysis request to be processed and a corrected conformity rate, obtained by multiplying a conformity rate recorded for another data analysis request source by a predetermined weighting factor, for each extracted filter, and selecting a filter having a maximum sum of filter conformity rates of the extracted filters as a recommended filter.

9. A non-transitory computer readable storage medium storing thereon a data analysis program, which when executed, causes a computer comprising a processor and a memory to execute data analysis in response to a data analysis request from a plurality of data analysis request sources, the computer storing input data to be analyzed for each of the data analysis request sources and an application history of a filter applied in response to the data analysis request, the program causing the computer to execute:

a process of receiving the data analysis request to extract the input data to be analyzed;

a process of referring to the filter application history for the data analysis request to select a filter suitable for data analysis to be executed;

a process of applying the selected filter to the input data to perform filtering of the input data;

a process of performing analysis processing of the filtered input data;

a process of storing result data which is the analyzed data;

a process of recording a filter conformity rate, which is an index indicating a degree of conformity of a filter in data analysis processing executed on a type of each of the filters, and a filter condition for each of stored filters in association with a filter selection criterion and a filter selection criterion content included in the data analysis request for each of the data analysis request sources;

a process or calculating the filter conformity rate as a sum of a conformity rate recorded for a data analysis request source of a data analysis request to be processed and a corrected conformity rate, obtained by multiplying a conformity rate recorded for another data analysis request source by a predetermined weighting factor, for each extracted filter; and a process of selecting a filter having a maximum sum of filter conformity rates of the extracted filters as a recommended filter.

* * * * *